United States Patent
Kawaguchi

(10) Patent No.: US 11,693,368 B2
(45) Date of Patent: Jul. 4, 2023

(54) ELECTRONIC TIMEPIECE, MOVEMENT, AND MOTOR CONTROL CIRCUIT

(71) Applicant: Seiko Epson Corporation, Tokyo (JP)

(72) Inventor: Takashi Kawaguchi, Shiojiri (JP)

(73) Assignee: SEIKO EPSON CORPORATION

(*) Notice: Subject to any disclaimer, the term of this patent is extended or adjusted under 35 U.S.C. 154(b) by 106 days.

(21) Appl. No.: 16/716,577

(22) Filed: Dec. 17, 2019

(65) Prior Publication Data
US 2020/0192297 A1    Jun. 18, 2020

(30) Foreign Application Priority Data
Dec. 18, 2018 (JP) .............................. JP2018-236387

(51) Int. Cl.
| | |
|---|---|
| H02P 25/064 | (2016.01) |
| H02P 5/00 | (2016.01) |
| G04C 3/14 | (2006.01) |
| H02P 6/04 | (2016.01) |
| H02P 6/182 | (2016.01) |

(52) U.S. Cl.
CPC ............. *G04C 3/143* (2013.01); *G04C 3/146* (2013.01); *H02P 6/04* (2013.01); *H02P 6/182* (2013.01); *H02P 2006/045* (2013.01)

(58) Field of Classification Search
CPC ................................ H02P 21/05; H02P 23/04
See application file for complete search history.

(56) References Cited

U.S. PATENT DOCUMENTS

| | | | |
|---|---|---|---|
| 4,360,767 A | 11/1982 | Akiyama et al. | |
| 6,072,752 A * | 6/2000 | Igarashi | G04C 3/146 368/80 |
| 2008/0309274 A1 * | 12/2008 | Thomson | H02P 8/14 318/567 |
| 2010/0001673 A1 * | 1/2010 | Cardoletti | H02P 6/18 318/400.34 |
| 2011/0205853 A1 * | 8/2011 | Kamiyama | G04C 3/146 368/80 |

FOREIGN PATENT DOCUMENTS

| | | |
|---|---|---|
| JP | S63-010668 A | 1/1988 |
| JP | H07-218658 A | 8/1995 |
| JP | 2007-318936 A | 12/2007 |
| JP | 2009-542186 A | 11/2009 |
| JP | 2011-061929 A | 3/2011 |

\* cited by examiner

*Primary Examiner* — Kawing Chan
*Assistant Examiner* — Charles S Laughlin
(74) *Attorney, Agent, or Firm* — Harness, Dickey & Pierce, P.L.C.

(57) ABSTRACT

Provided is an electronic timepiece capable of suppressing variation in the drive speed of a rotor, and driving a motor at a constant speed. The electronic timepiece has a driver; a controller that controls the driver to the on state or the off state according to a current flowing through a coil of a motor; a detection signal output device configured to output a detection signal when the on time or the off time, which are the continuous time of the on state and off state of the driver, meets a specific condition; a reference signal output device that outputs a reference signal used as a reference of a drive speed of the motor; and a drive cycle adjuster that compares the output timing of the detection signal and the reference signal, shortens the drive cycle when the detection signal is output after the reference signal, and when the detection signal is output before the reference signal, lengthens the drive cycle of the motor.

12 Claims, 21 Drawing Sheets

ELECTRONIC TIMEPIECE, MOVEMENT, AND MOTOR CONTROL CIRCUIT

BACKGROUND

1. Technical Field

The present invention relates to an electronic timepiece, a movement, and a motor control circuit.

The present application claims priority from and incorporates by reference the entire contents of Japanese Patent Application No. 2018-236387 filed in Japan on Dec. 18, 2018.

2. Related Art

JP-T-2009-542186 describes a technique for controlling rotation of a motor by turning the supply of current to the coil of the motor off when the current flow through the coil exceeds an upper threshold, and on when the current flow goes below a lower limit, and estimating the position of the rotor of the motor from the on time that power supply continues and the off time during which the power supply is continuously off.

With the control technology described above, the time required for the rotor to turn a specific amount, such as the time required for the rotor of a two pole motor to turn 180 degrees, varies according to the drive conditions, such as the load that is driven by the motor and the temperature. As a result, the drive speed of the rotor varies, and this technology cannot be used for a display that requires driving the motor at a constant speed.

SUMMARY

An electronic timepiece according to the present disclosure described herein includes a motor with a coil; a driver that is controlled to an on state supplying drive current to the coil, and an off state not supplying the drive current; a current detector configured to detect a current value flowing through the coil; a controller configured to control the driver to the on state or the off state according to the current value detected by the current detector; a detection signal output device configured to output a detection signal when an on time, which is the continuous time of the on state of the driver, or an off time, which is the continuous time of the off state of the driver, meets a specific condition; a reference signal output device configured to output a reference signal used as a reference of a drive speed of the motor; and a drive cycle adjuster configured to compare an output timing of the detection signal and the reference signal, when the detection signal is output after the reference signal, shorten a drive cycle of the motor compared with the drive cycle of the motor when the detection signal is output before the reference signal, and when the detection signal is output before the reference signal, lengthen a drive cycle of the motor compared with the drive cycle of the motor when the detection signal is output after the reference signal.

In an electronic timepiece according to another aspect of the present disclosure, when the detection signal is output after the reference signal, the drive cycle adjuster changes the polarity of the drive current after a first specific time has past, and when the detection signal is output before the reference signal, changes the polarity of the drive current after a second specific time, which is longer than the first specific time, has past.

In an electronic timepiece according to another aspect of the present disclosure, the current detector detects and compares the current value flowing through the coil with a minimum current and a maximum current; and the drive cycle adjuster sets the minimum current to a first minimum current, and sets the maximum current to a first maximum current, when the detection signal is output after the reference signal, and sets the minimum current to a second minimum current, which is smaller than the first minimum current, and sets the maximum current to a second maximum current, which is smaller than the first maximum current, when the detection signal is output before the reference signal.

In an electronic timepiece according to another aspect of the present disclosure, the driver is configured to enable setting a drive voltage supplied to the coil to a first drive voltage or a second drive voltage that is lower than the first drive voltage; and the drive cycle adjuster sets the drive voltage to the first drive voltage when the detection signal is output after the reference signal, and sets the drive voltage to the second drive voltage when the detection signal is output before the reference signal.

In an electronic timepiece according to another aspect of the present disclosure, the detection signal output device is configured to enable setting the specific condition to a first specific condition or a second specific condition, which is a time different from the first specific condition; and the drive cycle adjuster sets the specific condition to the first specific condition when the detection signal is output after the reference signal, and when the detection signal is output before the reference signal, sets the specific condition to the second specific condition.

In an electronic timepiece according to another aspect of the present disclosure, the driver is configured to enable setting a terminal supplying the drive current to the coil to a high impedance state or a shorted state; and the drive cycle adjuster sets the terminal to the high impedance state when the detection signal is output after the reference signal, and when the detection signal is output before the reference signal, sets the terminal to the shorted state.

In an electronic timepiece according to another aspect of the present disclosure, the reference signal output device starts outputting the reference signal after a specific time has past from starting driving the motor.

An electronic timepiece according to another aspect of the present disclosure preferably also has a stopwatch circuit configured to start outputting a time measurement clock signal and measure time in response to input of a start signal; the controller starts driving the motor when a first delay time has past after input of the start signal; and the reference signal output device outputs the time measurement clock signal delayed only a second delay time as the reference signal.

In an electronic timepiece according to another aspect of the present disclosure, the second delay time is set to a value greater than or equal to the sum of a cycle of the time measurement clock signal and variation in the drive time of the first step of the motor; and the first delay time is set to a difference between the sum of the cycle of the time measurement clock signal and the second delay time, and an average drive time of the first step of the motor.

In an electronic timepiece according to another aspect of the present disclosure, the current detector includes a minimum detector configured to detect that the current flowing through the coil changed from a state greater than the minimum current to a state less than the minimum current, and a maximum detector configured to detect that the current flowing through the coil changed from a state less than the maximum current to a state greater than the maximum current; and the controller controls the driver to the on state in response to detection by the minimum detector, and controls the driver to the off state in response to detection by the maximum detector.

Another aspect of the present disclosure is a movement including: a motor with a coil; a driver that is controlled to an on state supplying drive current to the coil, and an off state not supplying the drive current; a current detector configured to detect a current value flowing through the coil; a controller configured to control the driver to the on state or the off state according to the current value detected by the current detector; a detection signal output device configured to output a detection signal when an on time, which is the continuous time of the on state of the driver, or an off time, which is the continuous time of the off state of the driver, meets a specific condition; a reference signal output device configured to output a reference signal used as a reference of a drive speed of the motor; and a drive cycle adjuster configured to compare an output timing of the detection signal and the reference signal, when the detection signal is output after the reference signal, shorten a drive cycle of the motor compared with the drive cycle of the motor when the detection signal is output before the reference signal, and when the detection signal is output before the reference signal, lengthen a drive cycle of the motor compared with the drive cycle of the motor when the detection signal is output after the reference signal.

Another aspect of the present disclosure is a motor control circuit including: a driver that is controlled to anon state supplying drive current to a coil of a motor, and an off state not supplying the drive current; a current detector configured to detect a current value flowing through the coil; a controller configured to control the driver to the on state or the off state according to the current value detected by the current detector; a detection signal output device configured to output a detection signal when an on time, which is the continuous time of the on state of the driver, or an off time, which is the continuous time of the off state of the driver, meets a specific condition; a reference signal output device configured to output a reference signal used as a reference of a drive speed of the motor; and a drive cycle adjuster configured to compare an output timing of the detection signal and the reference signal, when the detection signal is output after the reference signal, shorten a drive cycle of the motor compared with the drive cycle of the motor when the detection signal is output before the reference signal, and when the detection signal is output before the reference signal, lengthen a drive cycle of the motor compared with the drive cycle of the motor when the detection signal is output after the reference signal.

Other objects and attainments together with a fuller understanding of the invention will become apparent and appreciated by referring to the following description and claims taken in conjunction with the accompanying drawings.

DESCRIPTION OF EMBODIMENTS

Embodiment 1

An electronic timepiece 1 according a first embodiment is described below with reference to the accompanying figures.

The electronic timepiece 1 is a wristwatch that is worn on a wrist of the user, and more particularly is a chronograph watch having multiple display functions including, in addition to a 12-hour time display using conventional hour, minute, and second hands, a chronograph minute display, a chronograph seconds display, a chronograph $1/10$ second display, and a chronograph $1/500$ second display.

Figure 1:
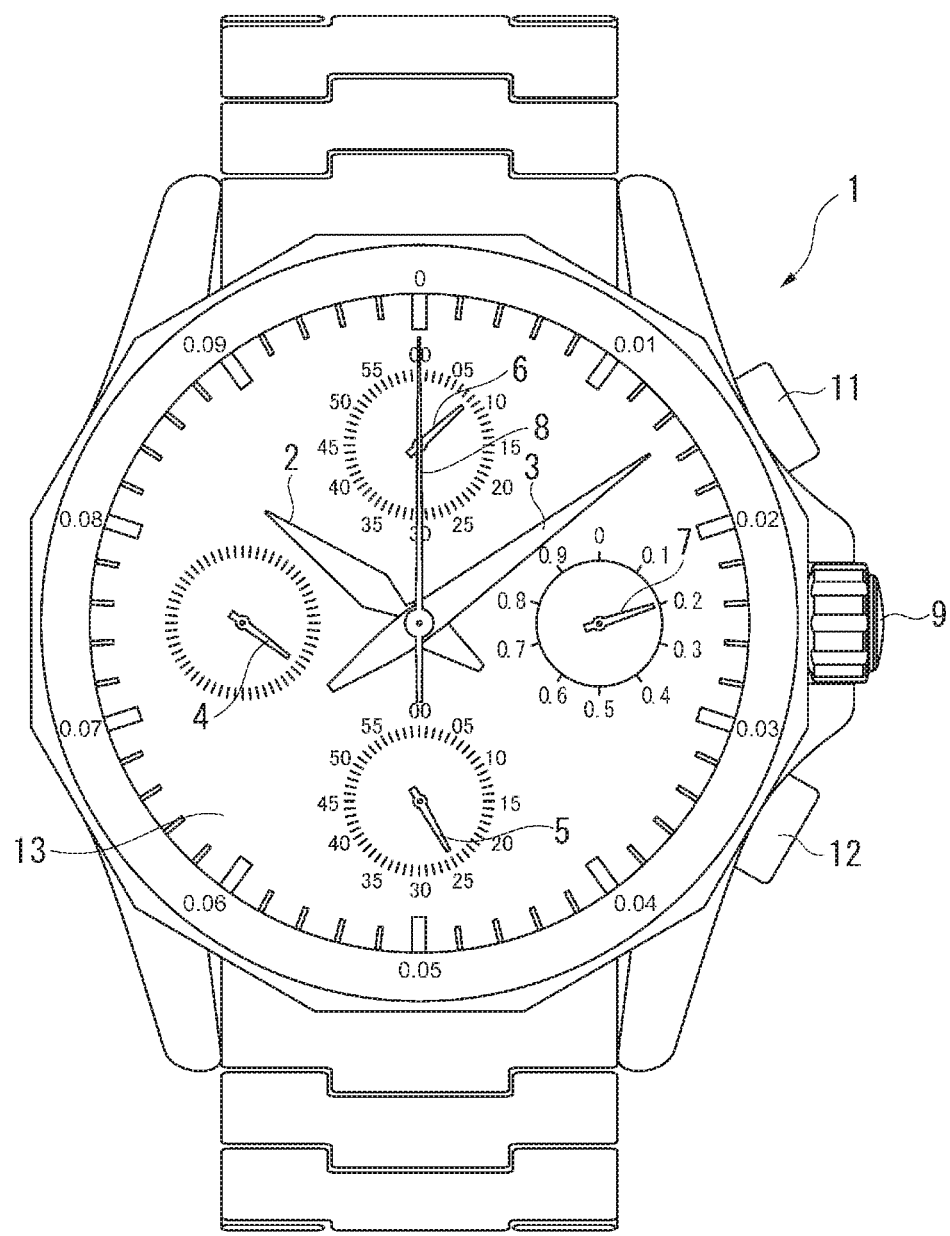
FIG. 1 is a front view of an electronic timepiece according to the first embodiment.

As shown in FIG. 1, the electronic timepiece 1 has an hour hand 2, minute hand 3, and second hand 4 for indicating the time on a 12-hour time display; a chronograph minute hand 5 for indicating the chronograph minute; a chronograph second hand 6 for indicating the chronograph second; a chronograph $1/10$ second hand 7 for indicating the chronograph $1/10$ second; and a chronograph $1/500$ second hand 8 for indicating the chronograph $1/500$ second. The electronic timepiece 1 also has a crown 9, A button 11, and B button 12 as operating members.

The hour hand 2 and minute hand 3 are disposed rotatably coaxially to the center of the dial 13 in a plan view perpendicularly to the surface of the dial 13 of the electronic timepiece 1.

The second hand 4 is disposed rotatably on a pivot that is independent of the other pivots at the 9:00 side of the center of the dial 13 in plan view.

The chronograph minute hand 5 is disposed rotatably on a pivot that is independent of the other pivots at the 6:00 side of the center of the dial 13 in plan view.

The chronograph second hand 6 is disposed rotatably on a pivot that is independent of the other pivots at the 12:00 side of the center of the dial 13 in plan view.

The chronograph 1/10 second hand 7 is disposed rotatably on a pivot that is independent of the other pivots at the 3:00 side of the center of the dial 13 in plan view.

The chronograph 1/500 second hand 8 is disposed rotatably on a pivot that is coaxial to the hour hand 2 and minute hand 3 in the center of the dial 13 in plan view.

Markers that are pointed to by the chronograph 1/500 second hand 8 are disposed around the outside edge of the dial 13. Subdials for the second hand 4, chronograph minute hand 5, chronograph second hand 6, and chronograph 1/10 second hand 7 are disposed to the dial 13 offset respectively to the 9:00 position, 6:00 position, 12:00 position, and 3:00 position from the center of the dial 13.

The hour hand 2, minute hand 3, and second hand 4 move together to indicate the current time.

The chronograph 1/500 second hand 8 turns one revolution in 1/10 second, is driven fifty steps in one revolution, and therefore displays the stopwatch time in 1/500 second units.

Note that the scale around the outside edge of the dial 13 is divided into fifty markers for the chronograph 1/500 second hand 8, and markers for the hour hand 2 and minute hand 3 are not provided. A separate scale of sixty markers may therefore also be provided around the outside of the dial 13. However, because the user typically reads the time from the positions of the hour hand 2 and minute hand 3, markers for the hour hand 2 and minute hand 3 are not always necessary.

The chronograph 1/10 second hand 7 turns one revolution in one second, is driven ten steps in one revolution, and therefore displays the stopwatch time in 1/10 second units.

The chronograph second hand 6 turns one revolution in 60 seconds, is driven sixty steps in one revolution, and therefore displays the stopwatch time in 1 second units.

The chronograph minute hand 5 turns one revolution in 60 minutes, is driven sixty steps in one revolution, and therefore displays the stopwatch time in 1 minute units.

Circuit Configuration of the Electronic Timepiece

Figure 2:
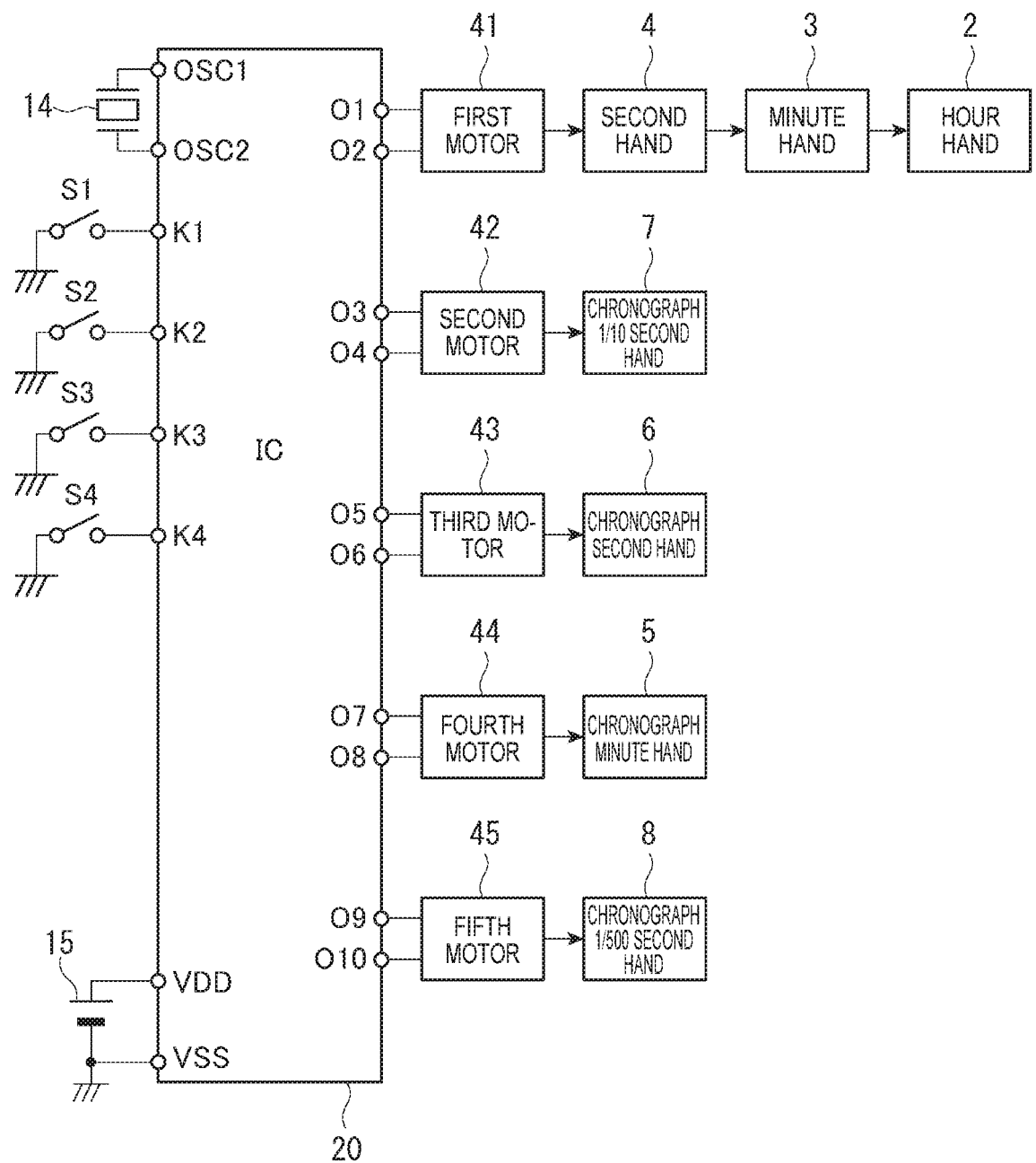
FIG. 2 is a circuit diagram showing the circuit configuration of the electronic timepiece according to the first embodiment.

As shown in FIG. 2, the electronic timepiece 1 has a movement including a crystal oscillator 14 as a signal source, a switch S1 that turns on and off in conjunction with operation of the A button 11, a switch S2 that turns on and off in conjunction with operation of the B button 12, switches S3 and S4 that turn on and off in conjunction with the crown 9 being pulled out, and a timekeeping chip 20. As described below, the movement of the electronic timepiece 1 also includes a first motor 41, a second motor 42, a third motor 43, a fourth motor 44, and a fifth motor 45.

Motor Configuration

Figure 3:
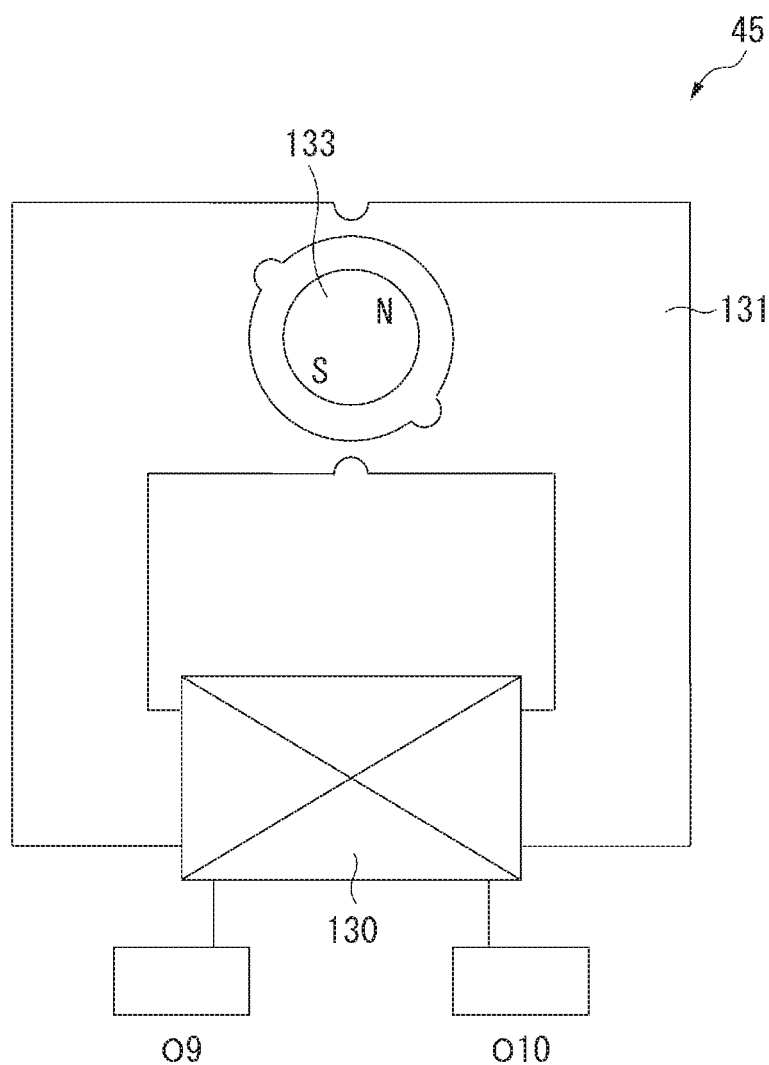
FIG. 3 shows the configuration of a motor in the electronic timepiece according to the first embodiment.

As shown in FIG. 3, the fifth motor 45 has a stator 131, a coil 130, and a rotor 133. The ends of the coil 130 have continuity with the output terminals O9 and O10 of the driver 51 described below, and the rotor 133 is a magnet with two opposite poles formed in the radial direction. The fifth motor 45 is therefore a two pole, single phase stepper motor used in electronic timepieces, and as described below is driven by a drive signal input by the driver 51.

The first motor 41 to fourth motor 44 are also two pole, single phase stepper motors identical to the fifth motor 45, and further description thereof is omitted.

The hour hand 2, minute hand 3, and second hand 4 are driven by a wheel train not shown in the figures, and are driven by the first motor 41. Note that in this example the hour hand 2, minute hand 3, and second hand 4 are driven by a single first motor 41, but a motor that drives the second hand 4, and a motor that drives the minute hand 3 and hour hand 2, for example, may be separately provided.

The chronograph 1/10 second hand 7 is driven by the second motor 42, the chronograph second hand 6 is driven by the third motor 43, the chronograph minute hand 5 is driven by the fourth motor 44, and the chronograph 1/500 second hand 8 is driven by the fifth motor 45.

As shown in FIG. 2, the timekeeping chip 20 has connection terminals OSC1 and OSC2 to which the crystal oscillator 14 is connected; input terminals K1, K2, K3, K4 to which switches S1, S2, S3, and S4 are connected; power supply terminals VDD and VSS to which the 15 is connected, and output terminals O1 to O10 to which the coils 130 of the first motor 41 to fifth motor 45 are connected.

Note that in this embodiment the positive pole of the battery 15 connects to the power supply terminal VDD on the high potential side, the negative pole connects to the power supply terminal VSS on the low potential side, and the power supply terminal VSS on the low potential side is set to ground (reference potential).

The crystal oscillator 14 is driven by an oscillation circuit 21 described below and produces an oscillation signal.

The battery 15 is a primary battery or a storage battery. If a storage battery, the battery 15 may be charged by solar cell not shown, for example.

The switch S1 is a pushbutton switch that is operated in conjunction with the A button 11 disposed to approximately the 2:00 position on the electronic timepiece 1, is on while the A button 11 is depressed, and is off when the A button 11 is not depressed.

The switch S2 is a pushbutton switch that is operated in conjunction with the B button 12 disposed to approximately the 4:00 position on the electronic timepiece 1, is on while the B button 12 is depressed, and is off when the B button 12 is not depressed.

Switches S3 and S4 are slide switches that operate in conjunction with pulling the crown 9. In this embodiment, switch S3 is on and switch S4 is off when the crown 9 is pulled out to the first stop, switch S4 is on and switch S3 is off when the crown 9 is pulled out to the second stop, and both switches S3 and S4 are off when the crown 9 is at the zero stop.

Circuit Configuration of the Timekeeping Chip

Figure 4:
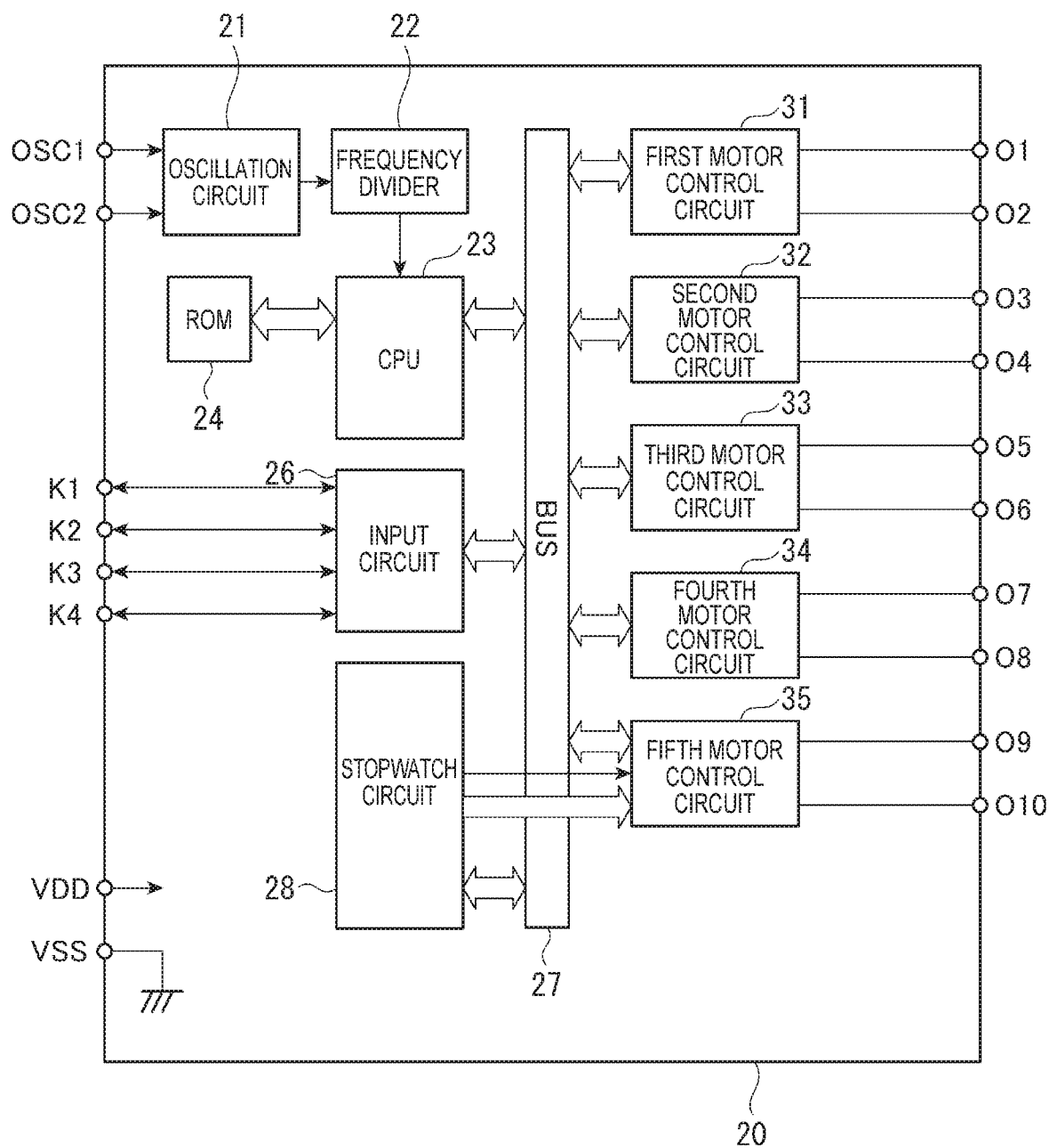
FIG. 4 illustrates the configuration of an IC chip in the electronic timepiece according to the first embodiment.

As shown in FIG. 4, the timekeeping chip 20 includes an oscillation circuit 21, frequency divider 22, a CPU (central processing unit) 23 for controlling the electronic timepiece 1, ROM (read-only memory) 24, an input circuit 26, a bus 27, and a stopwatch circuit 28. The timekeeping chip 20 also has a first motor control circuit 31 that drives the first motor 41, a second motor control circuit 32 that drives the second motor 42, a third motor control circuit 33 that drives the third motor 43, a fourth motor control circuit 34 that drives the fourth motor 44, and a fifth motor control circuit 35 that drives the fifth motor 45.

The oscillation circuit 21 causes the crystal oscillator 14, which is a reference signal source, at a high frequency, and outputs an oscillation signal at a specific frequency (32768 Hz) produced by the high frequency oscillation to the frequency divider 22.

The frequency divider 22 frequency divides the output of the oscillation circuit 21, and supplies a timing signal (clock signal) to the CPU 23.

The ROM 24 stores programs executed by the CPU 23. In this embodiment, the ROM 24 stores, for example, a program for executing a basic timekeeping function.

The CPU 23 executes programs stored in the ROM 24 to execute specific functions.

The input circuit 26 outputs the state of the input terminals K1, K2, K3, K4 to the bus 27. The bus 27 is used for data transfers between the CPU 23, input circuit 26, first motor control circuit 31, second motor control circuit 32, third motor control circuit 33, fourth motor control circuit 34, and fifth motor control circuit 35.

The stopwatch circuit 28 is a circuit for executing the stopwatch function, that is, the chronograph function, and operates according to operation of the A button 11 and B button 12 when the crown 9 is at the zero stop.

The A button 11 is used as a button to start and stop time measurement by the stopwatch circuit 28. The B button 12 is used as a button to split and reset time measurement by the stopwatch circuit 28.

The first motor control circuit 31 to fifth motor control circuit 35 control driving the first motor 41 to fifth motor 45 according to commands input from the CPU 23 through the bus 27.

Motor Control Circuit Configuration

Because the first motor control circuit 31 drives the first motor 41 each second, the first motor control circuit 31 is a motor control circuit used in wristwatches, for example, to enable reducing power consumption. More specifically, after outputting a primary drive pulse with a small pulse width, the first motor control circuit 31 measures the induced EMF of the coil 130 of the first motor 41 and detects whether or not the rotor 133 turned. If the rotor 133 did not turn, the first motor control circuit 31 outputs a compensation drive pulse of a fixed pulse width that is greater than the primary drive pulse to reliably turn the rotor 133.

As in a common analog chronograph timepiece, the second motor control circuit 32, third motor control circuit 33, and fourth motor control circuit 34 drive the respective hands one step at a time in response to control signals output from the CPU 23 according to a stopwatch interrupt signal output from the stopwatch circuit 28.

More specifically, the stopwatch circuit 28 outputs an interrupt signal to the CPU 23. Based on this interrupt signal, the CPU 23 outputs control signals for driving the motors 42, 43, 44 to the respective motor control circuits 32, 33, 34. As a result, the second motor control circuit 32 drives the second motor 42 every 1/10 second, the third motor control circuit 33 drives the third motor 43 every one second, and the fourth motor control circuit 34 drives the fourth motor 44 every one minute.

Figure 5:
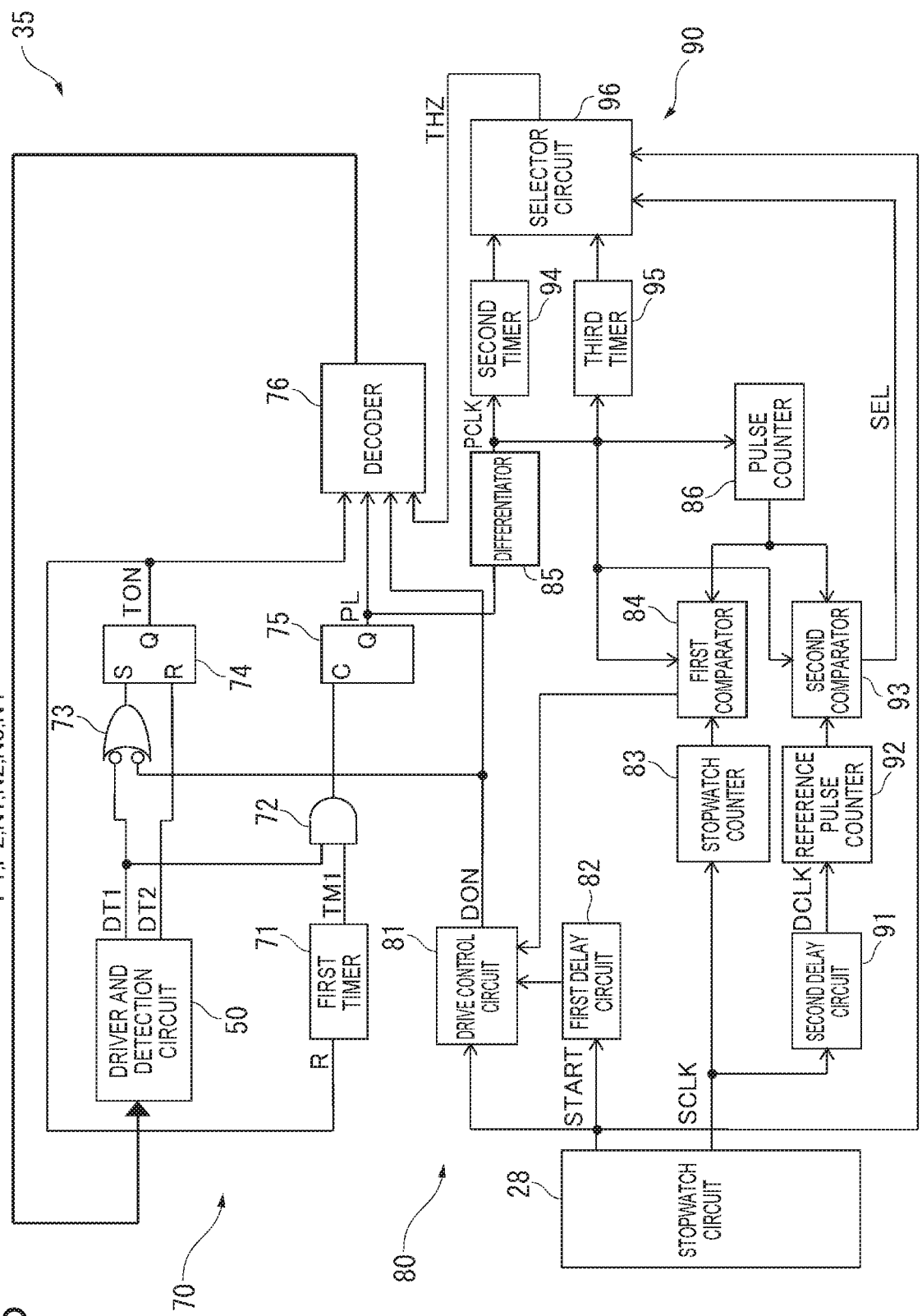
FIG. 5 is a circuit diagram showing the configuration of a fifth motor control circuit in the first embodiment.

As shown in FIG. 5, the fifth motor control circuit 35 has a motor controller 70 that detects rotation of the rotor 133 of the fifth motor 45 and controls changing the polarity of the current flowing to the coil 130; a chronograph controller 80 that controls starting and stopping operation of the motor controller 70 according to the start operation and the stop operation of the chronograph; and a drive cycle adjuster 90 that adjusts the drive frequency of the fifth motor 45.

Motor Controller

The motor controller 70 includes a driver and detection circuit 50, a first timer 71, an AND circuit 72, an OR circuit 73, an SR latch circuit 74, a flip-flop 75, and a decoder 76.

Figure 6:
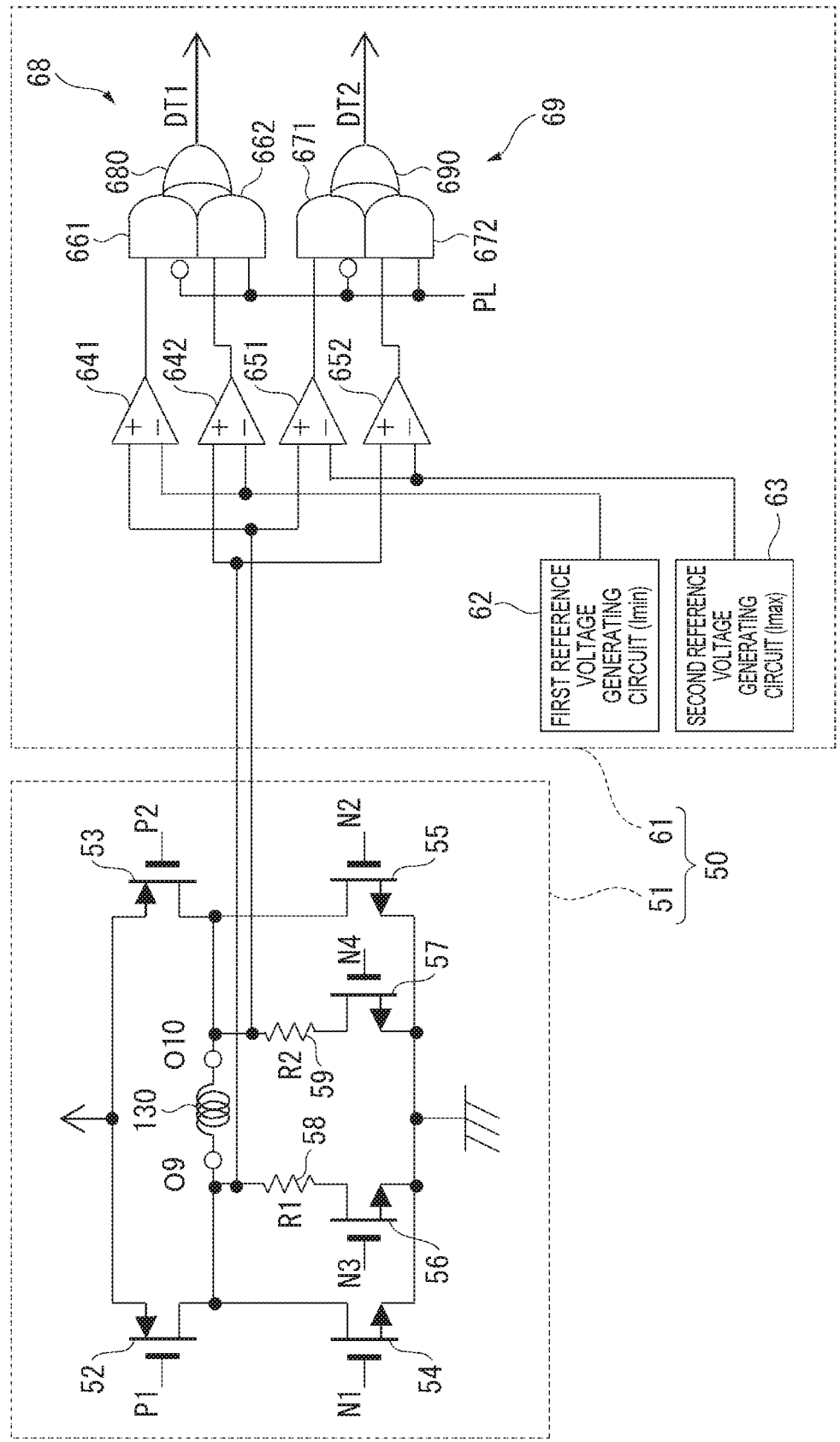
FIG. 6 is a circuit diagram showing the configuration of a driver and a detection circuit in the first embodiment.

As shown in FIG. 6, the driver and detection circuit 50 includes a driver 51 that supplies current to the coil 130 of the fifth motor 45, and a current detection circuit 61 that determines whether or not the current flow through the coil 130 exceeds a specific value. The current detection circuit 61 is a current detector that detects the current flow through the coil 130. The driver 51 and current detection circuit 61 are described below in detail.

The first timer 71 is a timer that measures an evaluation time t3, which is a condition for switching the polarity of the current flow through the coil 130 of the fifth motor 45. When the reset terminal R of the first timer 71 goes High before the evaluation time t3 passes after the reset terminal R goes Low and the first timer 71 is reset, the output TM1 of the 71 is held Low, and the output TM1 goes High when the evaluation time t3 has past while the reset terminal R is Low.

A detection signal DT1 that is output from the driver and detection circuit 50, and the output TM1 of the first timer 71, are input to the AND circuit 72.

The inverted detection signal DT1 output from the driver and detection circuit 50, and the inverted drive control signal DON output from a drive control circuit 81, are input to the OR circuit 73.

The output of the OR circuit 73 is input to the set terminal S, and the detection signal DT2 from the driver and detection circuit 50 is input to the reset terminal R, of the SR latch circuit 74. The SR latch circuit 74 outputs a switching signal TON for switching the on/off state of the driver 51 from output terminal Q. The switching signal TON is input to the decoder 76 and the reset terminal R of the first timer 71.

The output of the AND circuit 72 is input to the clock terminal C of the flip-flop 75. The flip-flop 75 outputs a drive polarity signal PL to change the polarity of the drive signal from the output terminal Q.

The switching signal TON output from the SR latch circuit 74, the drive polarity signal PL output from the flip-flop 75, the drive control signal DON output from the drive control circuit 81 described below, and a high impedance period signal THZ output from a selector circuit 96 described below are input to the decoder 76.

As shown in the timing chart in FIG. 8 described below, the decoder 76 outputs gate signals P1, P2, N1, N2, N3, N4 as drive signals to the driver 51 according to the states of the input signals.

Chronograph Controller

The chronograph controller 80 includes a drive control circuit 81, a first delay circuit 82, a stopwatch counter 83, a first comparator 84, a differentiator 85, and a pulse counter 86. The chronograph controller 80 operates according to a chronograph start signal START and a clock signal SCLK for time measurement that are output from the stopwatch circuit 28.

When a delay signal is input from the first delay circuit 82, the drive control circuit 81 sets the drive control signal DON to High. When the start signal START changes to Low, and the counts of the pulse counter 86 and stopwatch counter 83 that are compared by the first comparator 84 match, the drive control circuit 81 sets the drive control signal DON to Low.

When a first delay time t1 has past after the start signal START output from the stopwatch circuit 28 goes High, the first delay circuit 82 changes the delay signal it outputs to the drive control circuit 81 to High.

The stopwatch counter 83 counts the count TMEAS of the stopwatch in 1/500 second units by counting a clock signal SCLK with a 1/500 second period output from the stopwatch circuit 28.

The differentiator 85 outputs a differential signal PCLK at each rise and fall in the drive polarity signal PL.

The pulse counter 86 counts the differential signals PCLK, and counts the drive step count nDRV, which is the number of differential signals PCLK that are output.

At the timing when the differential signal PCLK is output, that is, when the differential signal PCLK changes to High, the first comparator 84 compares the count TMEAS from the stopwatch counter 83 with the drive step count nDRV from the pulse counter 86.

Drive Frequency Adjuster

The drive cycle adjuster 90 includes a second delay circuit 91, a reference pulse counter 92, a second comparator 93, a second timer 94, a third timer 95, a selector circuit 96, and the pulse counter 86.

The second delay circuit 91 delays the clock signal SCLK output form the stopwatch circuit 28 by second delay time t2, and outputs a reference signal DCLK, which is the target value of the end drive timing of each step. The second delay circuit 91 is therefore a reference signal output device that outputs a reference signal used as the reference of the drive speed of the fifth motor 45.

The reference pulse counter 92 counts the reference signal DCLK and outputs reference step count nREF of the drive pulse count at that time.

At the timing when the differential signal PCLK is output, the second comparator 93 compares the reference step count nREF from the reference pulse counter 92 and the drive step count nDRV from the pulse counter 86, and based on the result of the comparison outputs selection signal SEL. More specifically, if the drive step count nDRV of the fifth motor 45 is greater than the reference step count nREF, the second comparator 93 outputs a High selection signal SEL, and otherwise outputs a Low selection signal SEL.

The second timer 94 outputs to the selector circuit 96 a signal that goes High when a first specific time t4 has past after differential signal PCLK is output, that is, after the differential signal PCLK changes to High.

The third timer 95 outputs to the selector circuit 96 a signal that goes High when a second specific time t5 has past after the differential signal PCLK is output.

The selector circuit 96 selects the output of the second timer 94 and third timer 95, and outputs the high impedance period signal THZ to the decoder 76, according to the selection signal SEL output from the second comparator 93 and the state of the start signal START.

Driver and Detection Circuit

As shown in FIG. 6, the driver and detection circuit 50 includes a driver 51 and a current detection circuit 61.

The driver 51 includes two P-channel transistors 52, 53, four N-channel transistors 54, 55, 56, 57, and two detection resistors 58, 59. The transistors 52 to 57 are controlled by the gate signals P1, P2, N1, N2, N3, N4 output from the decoder 76, and supply current in both forward and reverse directions to the coil 130 of the fifth motor 45.

The current detection circuit 61 includes a first reference voltage generating circuit 62, a second reference voltage generating circuit 63, comparators 641, 642, 651, 652, and complex gates 68, 69.

Complex gate 68 is a single element comprising the same functions as a combination of the AND circuits 661, 662, and OR circuit 680 shown in FIG. 6.

Complex gate 69 is a single element comprising the same functions as a combination of the AND circuits 671, 672, and OR circuit 690.

Comparators 641, 642 compare the voltages produced at the ends of the detection resistors 58, 59 of resistances R1, R2, and the voltage of the first reference voltage generating circuit 62.

Because the drive polarity signal PL is inverted and input to AND circuit 661, and the drive polarity signal PL is input without inversion to the AND circuit 662, the output of the comparators 641 and 642 selected based on the drive polarity signal PL is output as the detection signal DT1.

The comparators 651 and 652 compare the voltages produced at the ends of the detection resistors 58, 59 of resistances R1, R2, and the voltage of the second reference voltage generating circuit 63.

Because the drive polarity signal PL is input inverted to AND circuit 671, and the drive polarity signal PL is input without inversion to the AND circuit 672, the output of the comparators 651 and 652 selected according to the drive polarity signal PL is output as detection signal DT2.

The first reference voltage generating circuit 62 is configured to output a potential equivalent to the voltage produced at the ends of the detection resistors 58, 59 when the current flow through the coil 130 is minimum current Imin.

Therefore, when the current I flowing through the coil 130 is greater than or equal to minimum current Imin, the voltage produced at the ends of the detection resistors 58, 59 exceeds the output value of the first reference voltage generating circuit 62, and the detection signal DT1 goes High. However, when the current I is less than minimum current Imin, the detection signal DT1 goes Low.

As a result, the first reference voltage generating circuit 62, the comparators 641 and 642, and the complex gate 68 of the current detection circuit 61 embody a lower limit detector that detects when the current I flowing through the coil 130 is less than minimum current Imin.

The second reference voltage generating circuit 63 produces a voltage equivalent to maximum current Imax. Therefore, the detection signal DT2 of the current detection circuit 61 goes High when the current I flowing through the coil 130 exceeds the maximum current Imax, and is Low when the current I is less than or equal to the maximum current Imax.

As a result, the second reference voltage generating circuit 63, the comparators 651 and 652, and the complex gate 69 of the current detection circuit 61 embody an upper limit detector that detects when the current I flowing through the coil 130 exceeds the maximum current Imax.

A controller that controls the on state and off state of the driver 51 according to the current value detected by the current detection circuit 61 functioning as a current detector, that is, the detection signals DT1, DT2 that result from detecting the current, is embodied by the OR circuit 73, SR latch circuit 74, and decoder 76.

A detection signal output device that outputs a detection signal when the off time Toff, which is the continuous time the driver 51 is off, is greater than or equal to evaluation time t3, which is a specific condition, is embodied by the first timer 71, AND circuit 72, flip-flop 75, and differentiator 85, and the differential signal PCLK the differentiator 85 outputs is the detection signal.

Control Process of the Motor Control Circuit

When the CPU 23 of the timekeeping chip 20 detects the start operation of the chronograph function was asserted by the A button 11, the CPU 23 operates the stopwatch circuit 28 and starts the chronograph, that is, measuring time by the stopwatch.

Figure 7:
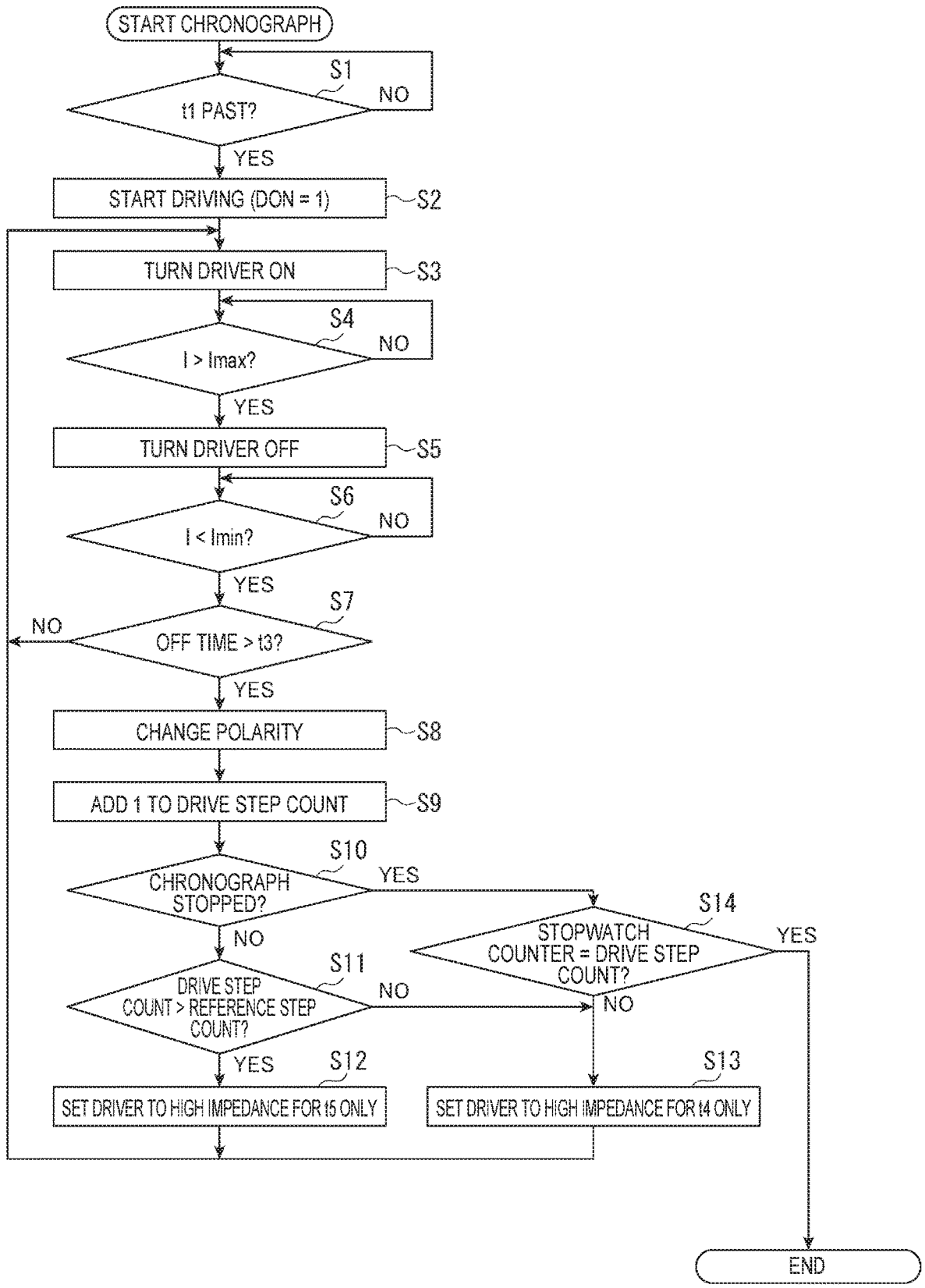
FIG. 7 is a flow chart describing the motor control process in the first embodiment.

Operation of the chronograph 1/500 second hand 8 that is executed by the chronograph function, that is, control by the fifth motor control circuit 35, is described below with reference to the flow chart in FIG. 7 and the timing chart in FIG. 8.

Operation of the chronograph 1/10 second hand 7, chronograph second hand 6, and chronograph minute hand 5, that is, control by the second motor control circuit 32, third motor control circuit 33, and fourth motor control circuit 34, is the same as the method of controlling driving the hands one step at a time by an interrupt signal output from the stopwatch circuit 28 in a conventional CPU-controlled analog chronograph watch, and further description thereof is omitted.

Operation of the Motor Control Circuit

When stopwatch measurement starts in response to operation of switches S1 to S4, the start signal START is input from the stopwatch circuit 28 to the fifth motor control circuit 35. The fifth motor control circuit 35 then executes the process of step S1, and determines, based on the level of the delay signal output from the first delay circuit 82, if the first delay time t1 has past since the start of stopwatch measurement.

The first delay time t1 is set to a value close to the difference between the sum of drive cycle t0 and the second delay time t2, and the average drive time of the first step. The drive cycle t0 in this embodiment is 1/500 second.

The drive time of one step is the time past from when the drive control signal DON goes High and the driver 51 turns on, to when the polarity of the drive signal changes.

Note that this embodiment determines the timing to change the polarity of the drive signal was reached when the off time Toff, which is the time past since the driver 51 turned off, is greater than the evaluation time t3.

For example, if the variation in the drive cycle including the startup time is 0.5 msec, the second delay time t2 is greater than or equal to 2.5 msec, which is this variation of 0.5 msec plus the drive cycle t0 (t0=1/500 second=2 msec), and the second delay time t2 is therefore set in this embodiment to 3 msec including a margin of error. If the average drive time of the first step is 2.5 msec, the first delay time t1 is set to the sum of drive cycle t0 and the second delay time t2, which is 5 msec, minus 2.5 msec, that is, 2.5 msec. Note that the variation in the drive cycle can be determined from tests or simulations.

The second delay time t2 sets the timing when the reference signal DCLK is output relative to the timing when the clock signal SCLK is output. Because time measurement by the chronograph starts when the start signal START goes High, when the drive cycle t0 has past, that is, the timing when the first pulse of the clock signal SCLK is output, is when driving the fifth motor 45 starts. Therefore, the second delay circuit 91 starts outputting the reference signal DCLK when a specific time has past, or more specifically after second delay time t2 has past, after driving the fifth motor 45 starts.

If NO is returned in step S1, the fifth motor control circuit 35 continues the process of step S1. If YES is returned in step S1, that is, the first delay time t1 has past, the fifth motor control circuit 35 goes to step S2 and sets the drive control signal DON output from the drive control circuit 81 to High. In other words, if the High level is 1 and the Low level is 0, the drive control circuit 81 sets the drive control signal DON to 1.

When the drive control signal DON goes High, the fifth motor control circuit 35 executes step S3 to turn the driver 51 of the motor controller 70 on and start driving the chronograph 1/500 second hand 8.

More specifically, when the drive control signal DON goes High, the decoder 76 outputs the gate signals P1, P2, N1, N2, N3, N4 to the driver 51. As a result, step S3 of turning the driver 51 of the fifth motor 45 on executes, and current flows in the forward direction through the coil 130.

Note that in the flow chart and following description, the driver 51 turning on means controlling the driver 51 to an on state in which drive current can flow to the coil 130, and the driver 51 turning off means controlling the driver 51 to an off state in which drive current cannot flow to the coil 130.

Figure 8:
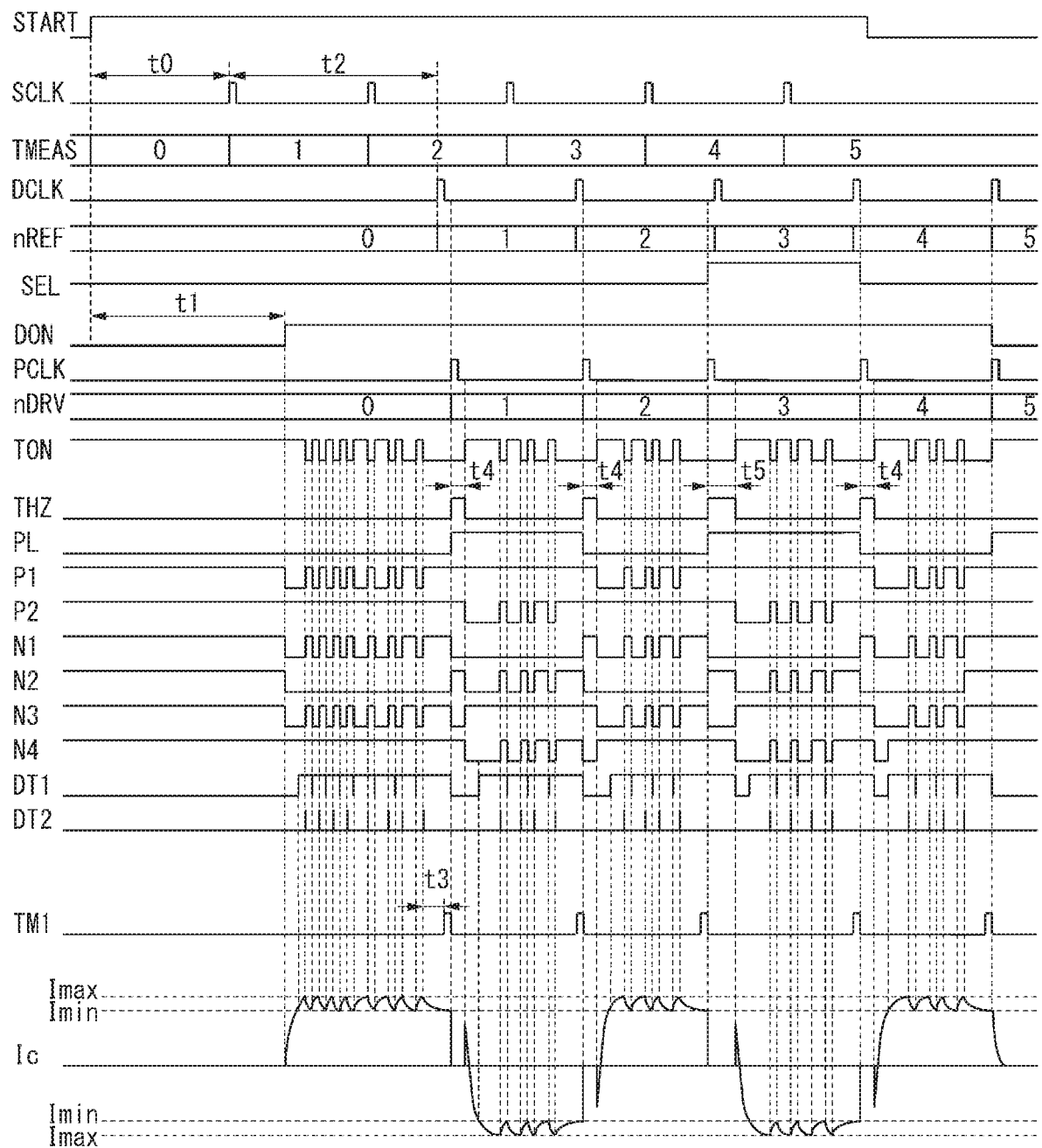
FIG. 8 is a timing chart describing the operation of the motor control process of the first embodiment.

In this embodiment, because P1 is Low and P2 is High immediately after the drive control signal DON goes High in the timing chart in FIG. 8, P-channel transistor 52 turns on and P-channel transistor 53 turns off. In addition, because N1 to N3 are Low, and N4 is High, N-channel transistors 54, 55, 56 turn off and N-channel transistor 57 turns on. As a result, current flows through P-channel transistor 52, terminal O9, coil 130, terminal O10, detection resistor 59, and N-channel transistor 57.

In this embodiment current flowing from terminal O9 toward terminal O10 through the coil 130 is current flowing in the forward direction (forward current). In addition, the drive current supplied to the coil 130 switches between a first polarity and a second polarity, and when set to the first polarity, current flows in the forward direction through the coil 130. Therefore, the state in which current flows forward through the coil 130 is the state in which the driver 51 is controlled to the on state by a drive signal of the first polarity.

The fifth motor control circuit 35 then executes step S4, and determines whether or not the current I flow through the coil 130 exceeds maximum current Imax. The fifth motor control circuit 35 returns NO in step S4 and repeats step S4 until the voltage output of the detection resistors 58, 59 exceeds the reference voltage of the first reference voltage generating circuit 62.

However, if the current I exceeds maximum current Imax, the fifth motor control circuit 35 returns YES in step S4, and sets the detection signal DT2 High. When the detection signal DT2 goes High, the reset input of the SR latch circuit 74 goes High, and the switching signal TON changes to Low. As a result, step S5 is executed, and the decoder 76 turns the driver 51 off by gate signals P1, P2, N1, N2, N3, N4. More specifically, P1 goes High, P2 goes High, N1 goes High, N2 goes Low, N3 goes High, and N4 goes High. As a result, both ends of the coil 130 are connected to power supply terminal VSS and shorted, and the supply of current I from the driver 51 to the coil 130 also stops. Therefore, the state in which current is not supplied to the coil 130 is a state in which the driver 51 is controlled to an off state. In this embodiment, the state in which P-channel transistors 52, 53 and N-channel transistor 55 are off, and N-channel transistors 54, 56, 57 are on, is the state the driver 51 is set to by the first polarity.

When the switching signal TON changes to Low, the rest of the first timer 71 is cancelled, and time measurement by the first timer 71 starts. When the driver 51 turns on and the switching signal TON changes to High, the first timer 71 is reset and measuring the evaluation time t3 stops.

Next, the fifth motor control circuit 35 executes step S6 and determines whether or not the current I flow through the coil 130 has gone below the minimum current Imin. When the fifth motor control circuit 35 returns YES in step S6, the fifth motor control circuit 35 executes step S7, and determines whether or not the off time of the driver 51 exceeds the evaluation time t3. More specifically, if the time past from when the driver 51 turns off to when the current I goes below the minimum current Imin, that is, the off time, is less than or equal to evaluation time t3, the fifth motor control circuit 35 returns NO in step S7, and returns YES in step S7 if the off time exceeds the evaluation time t3.

More specifically, if the current I is less than the minimum current Imin and the output TM1 is High at the time YES is determined in step S6, the off time of the driver 51 can be determined to exceed the evaluation time t3, and if the output TM1 is Low, the off time of the driver 51 can be determined to not exceed the evaluation time t3.

If NO is determined in step S7, the fifth motor control circuit 35 does not change the polarity, returns to step S3, turns the driver 51 on, and drives the fifth motor 45.

When the switching signal TON goes Low, the reset state of the first timer 71 is cleared and the first timer 71 starts measuring the evaluation time t3, and when the evaluation time t3 has past, the output TM1 of the first timer 71 goes High.

When the current I goes below the minimum current Imin, the detection signal DT1 changes to Low. In this event, if the off time the first timer 71 measures is less than the evaluation time t3, the output TM1 of the first timer 71 is held Low. As a result, even if the level of the detection signal DT1 changes, the output of the AND circuit 72 remains Low, and the drive polarity signal PL output from the flip-flop 75 is also held at the same level. Therefore, the driver 51 is turned on by the detection signal DT1 changing to Low and the switching signal TON of the SR latch circuit 74 changing to High without changing the polarity.

If the off time of the driver 51 exceeds the evaluation time t3, the signal level of the drive polarity signal PL output from the flip-flop 75 changes, and the process of changing the polarity of the drive signal is executed in step S8.

The output TM1 of the first timer 71 is Low until the evaluation time t3 is exceeded from when the driver 51 turns off, and goes High when the evaluation time t3 is exceeded. In addition, the detection signal DT1 is High when the driver 51 is turned off, and turns Low at the time the current I drops below the minimum current Imin. As a result, the output of the AND circuit 72 is held Low while the output TM1 is Low, and changes to High when the output TM1 changes to High while the detection signal DT1 is High.

The output of the AND circuit 72 is therefore held Low while the output TM1 is Low, and changes to High when the output TM1 changes to High while the detection signal DT1 is High. In addition, when the current I goes below the minimum current Imin and the detection signal DT1 changes to Low, the output of the AND circuit 72 changes from High to Low.

When a clock signal is input at the falling edge of the AND circuit 72 output going from High to Low, the state of the drive polarity signal PL from the flip-flop 75 inverts, and the decoder 76 changes the polarity of the drive signal to control the driver 51. Note that because there is a correlation between the off time of the driver 51 and the angular displacement of the rotor 133, the evaluation time t3 may be set based on the value produced when the rotor 133 turns approximately 180 degrees.

Therefore, a polarity switching device is embodied in this embodiment by a first timer 71 that measures the evaluation time t3 used as a condition for switching polarity, a current detection circuit 61 that detects that the current I is less than the minimum current Imin, an AND circuit 72 that outputs a clock signal based on the detection results, and a flip-flop 75 and a decoder 76 that switch the polarity of the drive signal according to the output signal of the AND circuit 72.

When the state of the drive polarity signal PL inverts and the polarity changes, the differential signal PCLK is output from the differentiator 85 to which the drive polarity signal PL is input, and the differential signal PCLK is input to the pulse counter 86. The fifth motor control circuit 35 therefore executes the process of step S9 and increments by one the drive step count nDRV that is counted by the pulse counter 86.

Next, the fifth motor control circuit 35 executes the process of step S10 to determine if the chronograph is stopped. If execution of an operation by switches S1 to S4 starting the chronograph is detected, the stopwatch circuit 28 sets the start signal START to High, and if a stop operation is detected, sets the start signal START to Low. Therefore, the drive cycle adjuster 90 of the fifth motor control circuit 35 can determine whether or not the chronograph is stopped based on the level of the start signal START.

When NO is determined in step S10, the fifth motor control circuit 35 executes the process of step S11 determining, based on the result from the second comparator 93, if the drive step count nDRV is greater than the reference step count nREF.

The reference pulse counter 92 counts the reference signal DCLK, which is the clock signal SCLK of a 1/500 second cycle input delayed second delay time t2 by the second delay circuit 91. The clock signal SCLK with a 1/500 second cycle is input to the stopwatch counter 83 without being delayed and counted. Therefore, as shown in FIG. 8, the reference step count nREF of the reference pulse counter 92 is increased at a second delay time t2 delay from the count TMEAS of the stopwatch counter 83.

The fifth motor control circuit 35 executes step S11 at the time the differential signal PCLK is output from the differentiator 85, and determines by the second comparator 93 whether or not the drive step count nDRV is greater than the reference step count nREF. If the drive step count nDRV is greater than the reference step count nREF, that is, YES is determined in step S11, the second comparator 93 outputs a High selection signal SEL to the selector circuit 96. If the drive step count nDRV is less than or equal to the reference step count nREF, that is, NO is determined in step S11, the second comparator 93 outputs a Low selection signal SEL to the selector circuit 96.

The selector circuit 96 outputs a high impedance period signal THZ, and while the high impedance period signal THZ is High, the decoder 76 sets the driver 51 to a high impedance so that a short brake is not applied, and until the high impedance period signal THZ changes to Low, does not execute the next on control of the driver 51 changing the polarity.

If YES is returned in step S11, that is, the selection signal SEL is High, the fifth motor control circuit 35 executes step S12 setting the driver 51 to a high impedance state for second specific time t5 only.

If NO is returned in step S11, that is, the selection signal SEL is Low, the fifth motor control circuit 35 executes step S13 setting the driver 51 to a high impedance state for first specific time t4 only.

As shown in FIG. 8, the second specific time t5 is set to a longer time than the first specific time t4. Therefore, when the drive step count nDRV is greater than the reference step count nREF, that is, if the drive timing of the fifth motor 45 is earlier than the target timing, the time to the next step drive becomes longer. However, if the drive step count nDRV is less than or equal to than the reference step count nREF, that is, if the drive timing of the fifth motor 45 is later than or matches the target timing, the time to the next step drive becomes shorter. As a result, the drive timing converges to the target timing.

When the second specific time t5 has past in step S12, and when the first specific time t4 has past in step S13, the fifth motor control circuit 35 sets the high impedance period signal THZ output from the selector circuit 96 to Low, returns to step S3, and controls the driver 51 to the on state.

If YES is determined in step S10, the fifth motor control circuit 35 executes the process of step S14 to determine, by means of the first comparator 84, whether or not the count TMEAS of the stopwatch counter 83 and the drive step count nDRV of the pulse counter 86 match.

If the first comparator 84 determines the count TMEAS and drive step count nDRV match and returns YES in step S14, the time measured to when the stop operation of the chronograph function was performed and the time indicated by the chronograph 1/500 second hand 8 match, and the fifth motor control circuit 35 therefore ends drive control of the fifth motor 45.

However, if NO is determined in step S14, the time indicated by the chronograph 1/500 second hand 8 has not reached the measured time. The fifth motor control circuit 35 therefore returns to step S3 after executing step S13, and continues drive control of the fifth motor 45.

Note that because the drive polarity signal PL is inverted when the fifth motor control circuit 35 returns to step S3 and turns the driver 51 on, the decoder 76 outputs gate signals set so that the current flow through the coil 130 is reversed from the previous direction. More specifically, P1 goes High, P2 goes Low, N1, N2, N4 go Low, and N3 goes High. As a result, P-channel transistor 52 is turned off, and P-channel transistor 53 is turned on. In addition, N-channel transistors 54, 55, 57 turn off, and N-channel transistor 56 turns on. As a result, current flows from P-channel transistor 53 to terminal O10, coil 130, terminal O9, detection resistor 58, and N-channel transistor 56. The drive current output to the coil 130 is the second polarity, and current flows to the coil 130 in the negative direction, that is, the opposite direction as the forward direction. The state in which current flows in the negative direction to the coil 130 is the state in which the driver 51 is controlled to the on state by a drive signal of the second polarity.

As shown in FIG. 8, the gate signals P1, P2, N1, N2, N3, N4 are set so that the direction of current flow through the coil 130, that is, the polarity, is different when nDRV=0, 2, 4 and when nDRV=1, 3.

The fifth motor control circuit 35 therefore controls operation as shown in FIG. 8 by repeating steps S3 to S14. More specifically, the driver 51 turns on when the current I goes below the minimum current Imin, and the driver 51 turns off when the current I exceeds the maximum current Imax.

If the current I goes below the minimum current Imin while the off time of the driver 51 has not exceeded the evaluation time t3, drive step count nDRV and reference step count nREF are compared, and based on the result of the comparison, the driver 51 is set to a high impedance for only second specific time t5 or first specific time t4. After this high impedance time passes, the polarity switches and drive control of the fifth motor 45 resumes. When the chronograph is stopped, drive control continues until the value of the stopwatch counter 83 and the drive step count nDRV match, and when these values match, drive control of the fifth motor 45 ends.

Effect of Embodiment 1

Because the fifth motor control circuit 35 in this embodiment enables converging the drive timing of the fifth motor 45 to the output timing of the reference signal DCLK used as a drive reference, the fifth motor 45 can be driven at a speed corresponding to the cycle of the reference signal DCLK. The chronograph 1/500 second hand 8 that is moved by the fifth motor 45 can also be moved at a constant speed. As a result, the electronic timepiece 1 can display the chronograph measurement by the chronograph 1/500 second hand 8 in substantially real time at the high speed of 1/500 second.

A drive cycle adjuster 90 for driving the fifth motor 45 at a speed corresponding to the reference signal DCLK can be easily achieved in the fifth motor control circuit 35 by adding only a logic circuit.

Because the second delay circuit 91 starts outputting the reference signal DCLK after a specific second delay time t2 has past when driving the fifth motor 45 starts, that is, from the first pulse of the clock signal SCLK, the second delay circuit 91 can be configured with consideration for delay due to the drive time from the initial start, for example.

More specifically, if driving the fifth motor 45 starts when the fifth motor 45 is at a dead stop, the time until driving ends in the first step is longer than when driving in the second and subsequent steps ends. Therefore, if the start output timing of the reference signal DCLK is set to after the drive cycle t0 has past from the first pulse of the clock signal SCLK, the difference with the detection signal that detects driving the fifth motor 45 the first step increases, and the time until convergence to a constant drive speed increases.

However, this embodiment enables shortening the time to convergence to a constant drive speed because output of the reference signal DCLK starts after a second delay time t2 has past since driving the fifth motor 45 starts, and the output of the reference signal DCLK can be set with consideration for delay due to the drive time at the initial start.

Because the reference signal DCLK is the clock signal SCLK, which is a clock signal for time measurement output from the stopwatch circuit 28, delayed only a second delay time t2, the drive cycle of the fifth motor 45 can be synchronized to the period of the reference signal DCLK, that is, the period of the clock signal SCLK. Therefore, the chronograph 1/500 second hand 8 can be moved synchronized to the stopwatch measurement.

The decoder 76 starts driving the fifth motor 45 after the first delay time t1 of the first delay circuit 82 has past since the time when the start signal START was input from the stopwatch circuit 28, that is, from when the drive control signal DON changes to High. The second delay time t2 is set to a time adding to the drive cycle t0 variation in the drive cycle including a specific margin.

The first delay time t1 is set to a time equal to the sum of the drive cycle t0 and second delay time t2 minus the first delay time t1, that is, so that (t0+t2−t1) is the average drive time of the first step driving the fifth motor 45. The differential signal PCLK that is output when rotation of the rotor 133 in the fifth motor 45 is detected can therefore constantly be delayed the drive cycle t0 or longer after the clock signal SCLK used for time measurement. As a result, the display of the chronograph 1/500 second hand 8, that is, the drive step count nDRV of the pulse counter 86, cannot surpass the time measurement of the stopwatch, that is, the count TMEAS of the stopwatch counter 83.

As a result, regardless of the timing when chronograph measurement stops, problems such as the chronograph 1/500 secondhand 8 indicating a time ahead of the time measured by the stopwatch are prevented. In other words, if the time indicated by the chronograph 1/500 second hand 8 is ahead of the measured value, the chronograph 1/500 second hand 8 must be driven substantially one extra cycle, or reversed, when measurement stops, and problems such as unnatural operation result, but this embodiment prevents such problems.

Note that the display will always be slower than the actual time measured by the stopwatch, but the delay is about one of several tenths of a second, indiscernible to the user, and therefore of no practical problem.

Because the fifth motor control circuit 35 is configured by a dedicated circuit using logic elements, low voltage drive and low power consumption can be achieved, and the fifth motor control circuit 35 is particularly suitable to wristwatches and other types of mobile electronic timepieces 1.

First Variation

In the first embodiment described above, steps S11, S12, S13 are executed from the first drive step of the fifth motor 45. However, because driving the fifth motor 45 is unstable when driving starts, control may return to step S3 without executing steps S11, S12, S13, and control by steps S11, S12, S13 may start from controlling the second or third drive steps, for example.

The second timer 94 may also be omitted and first specific time t4 set to 0. More specifically, when step S11 returns NO, and when step S14 returns NO, driving the next step may proceed immediately without inserting a high impedance period.

Embodiment 2

An electronic timepiece according to the second embodiment is described next with reference to FIG. 9 to FIG. 12. Note that configurations in the second embodiment that are the same or similar to configurations in the first embodiment are identified by the same reference numerals, and further description thereof is omitted.

Configuration

Figure 9:
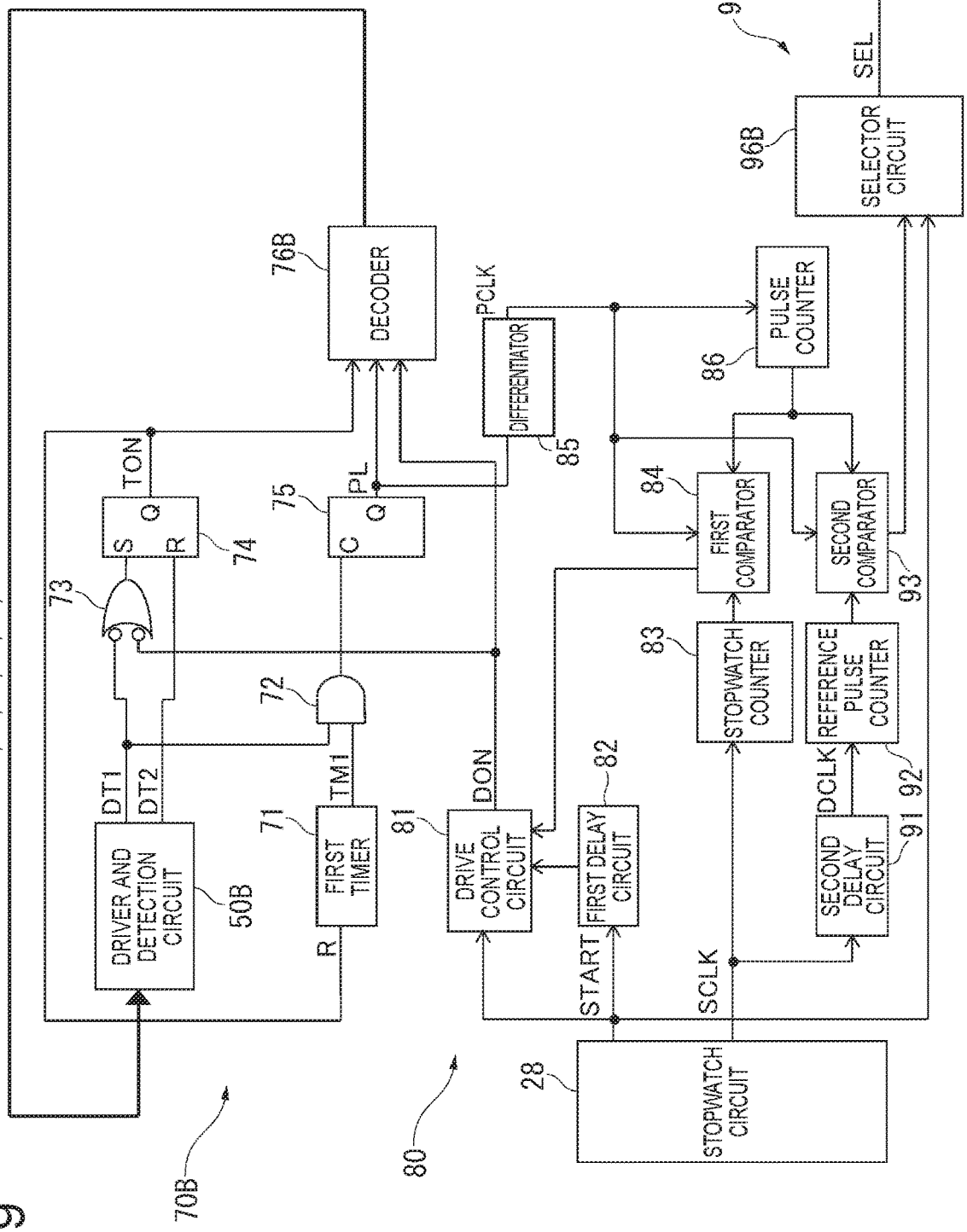
FIG. 9 is a circuit diagram showing the configuration of a fifth motor control circuit in the second embodiment.

An electronic timepiece according to the second embodiment has the fifth motor control circuit 35B shown in FIG. 9 instead of the fifth motor control circuit 35 of the first embodiment. The fifth motor control circuit 35B includes a motor controller 70B, chronograph controller 80, and drive cycle adjuster 90B.

The motor controller 70B includes a first timer 71, an AND circuit 72, an OR circuit 73, an SR latch circuit 74, and a flip-flop 75 configured as in the first embodiment, and a driver and detection circuit 50B, a decoder 76B that differ from those in the first embodiment.

Figure 10:
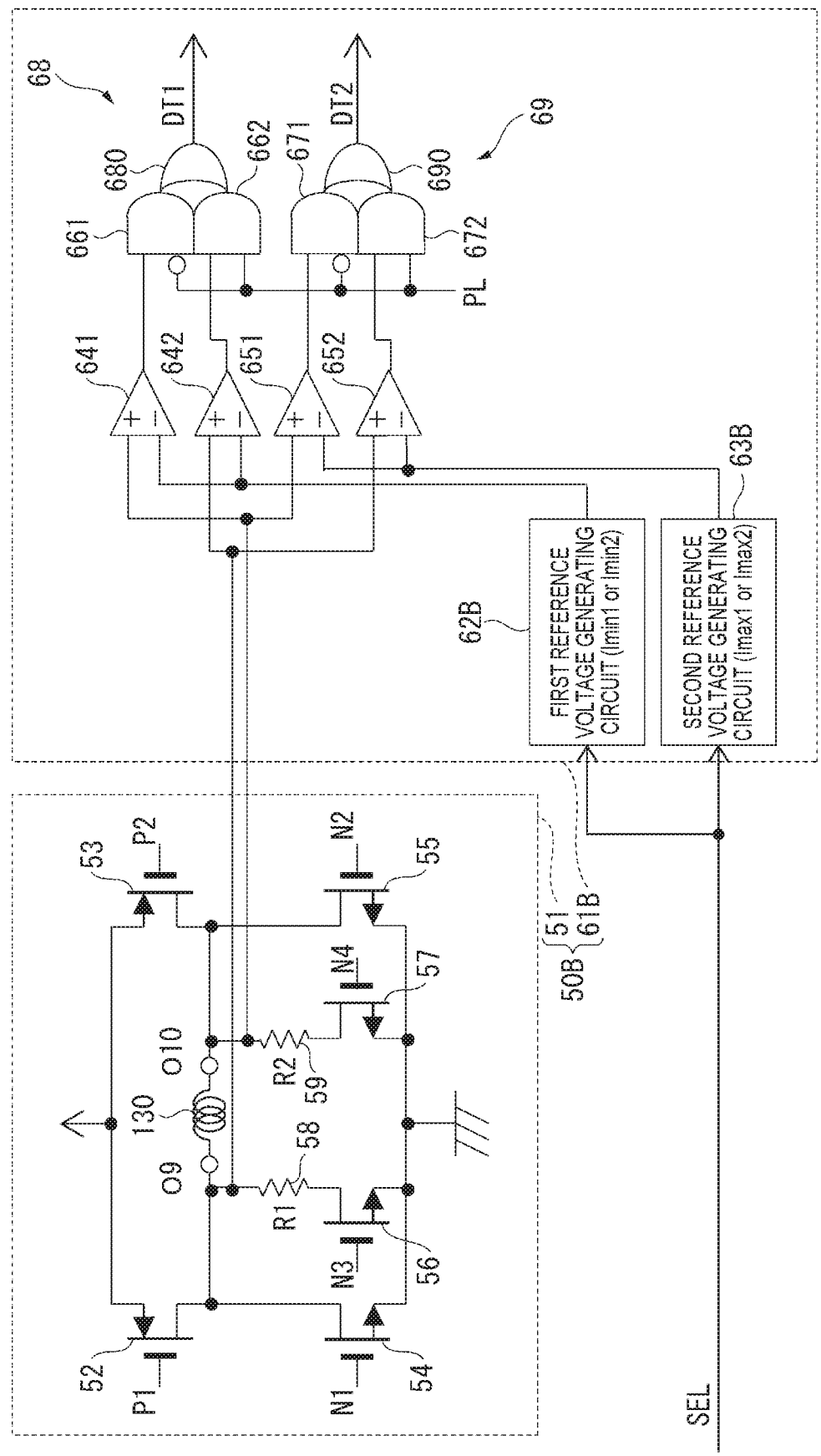
FIG. 10 is a circuit diagram showing the configuration of a driver and a detection circuit in the second embodiment.

As shown in FIG. 10, the driver and detection circuit 50B includes a driver 51, and a current detection circuit 61B. The driver 51 is the same as in the first embodiment. The current detection circuit 61B is the same as in the first embodiment except for also having a first reference voltage generating circuit 62B, and a second reference voltage generating circuit 63B.

Based on the selection signal SEL output from the selector circuit 96B described below, the first reference voltage generating circuit 62B selects either a first minimum current Imin1 or a second minimum current Imin2 as the minimum current Imin.

Based on the selection signal SEL output from the selector circuit 96B described below, the second reference voltage generating circuit 63B selects either a first maximum current Imax1 or a second maximum current Imax2 as the maximum current Imax.

In this embodiment, second minimum current Imin2 is a value less than first minimum current Imin1, and second maximum current Imax2 is a value lower than first maximum current Imax1.

The high impedance period signal THZ that is input to the decoder 76 in the first embodiment is not input to the decoder 76B, which outputs gate signals P1, P2, N1, N2, N3, N4 to the driver and detection circuit 50B based on the states of the switching signal TON, drive polarity signal PL, and drive control signal DON.

The chronograph controller 80 is the same as in the first embodiment, has a drive control circuit 81, first delay circuit 82, stopwatch counter 83, first comparator 84, differentiator 85, and pulse counter 86, and further description thereof is omitted.

The drive cycle adjuster 90B includes a second delay circuit 91, reference pulse counter 92, second comparator 93, selector circuit 96B, and pulse counter 86. The drive cycle adjuster 90B therefore differs from the drive cycle adjuster 90 in the first embodiment in not having a second timer 94 and third timer 95, and the configuration of the selector circuit 96B.

Based on the output of the second comparator 93 and the state of the start signal START output from the stopwatch circuit 28, the selector circuit 96B outputs to the current detection circuit 61B a selection signal SEL that switches the minimum current Imin and maximum current Imax between the two values described above.

Operation of Embodiment 2

Figure 11:
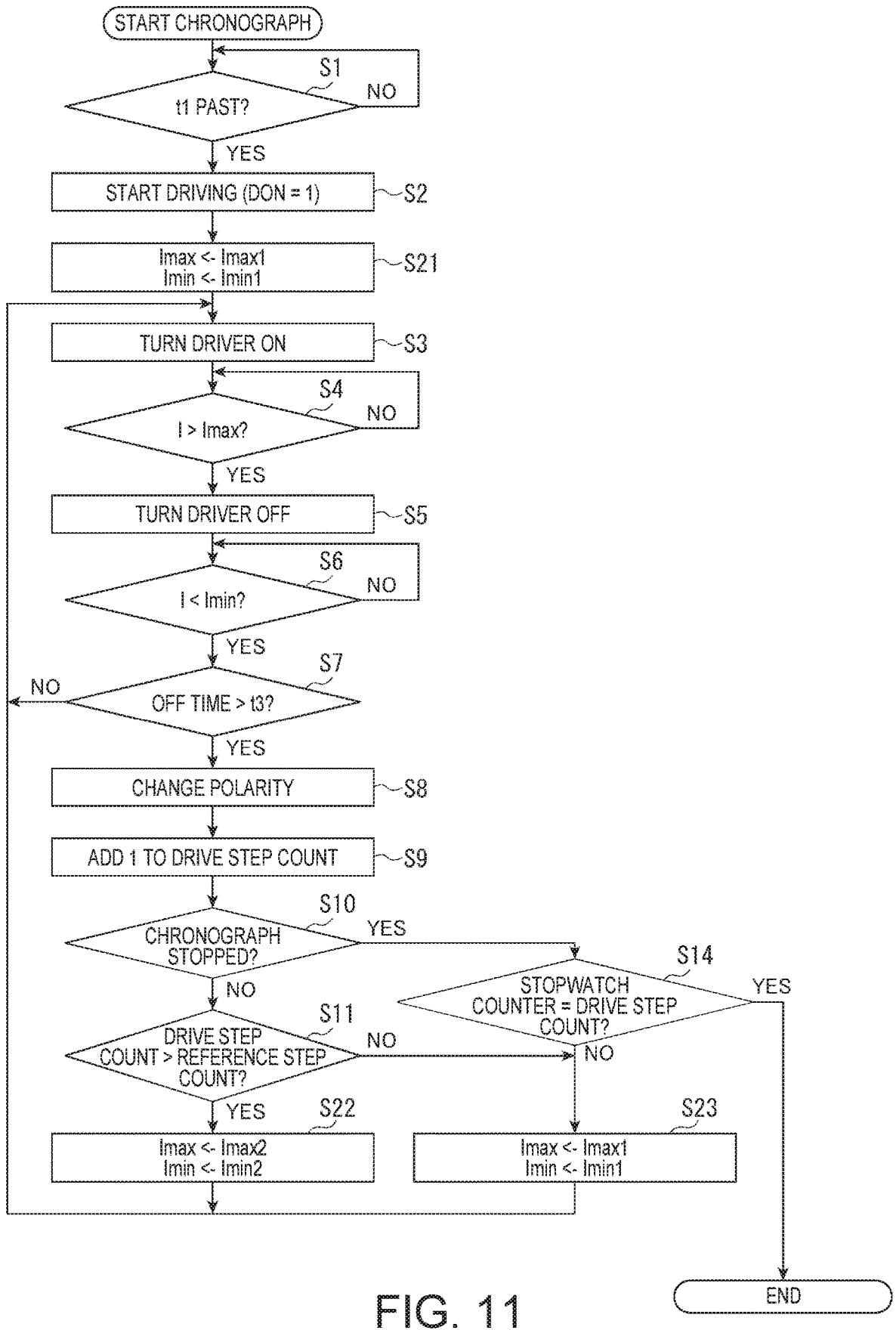
FIG. 11 is a flow chart describing the motor control process in the second embodiment.

Control by the fifth motor control circuit 35B in the second embodiment is described next with reference to the flow chart in FIG. 11 and the timing chart in FIG. 12. Note that the processes of steps S1 to S11 and step S14 in the flow chart in FIG. 11 are the same as the processes of steps S1 to S11 and step S14 in the flow chart in FIG. 7, further description thereof is omitted, and the differences with the process of the first embodiment are described below.

The fifth motor control circuit 35B executes step S21 after step S2, and sets first minimum current Imin1 and first maximum current Imax1 respectively as the initial values of the minimum current Imin of the first reference voltage generating circuit 62B and the maximum current Imax of the second reference voltage generating circuit 63B.

If YES is determined in step S11, the fifth motor control circuit 35B executes step S22, sets the maximum current Imax to the second maximum current Imax2, and sets the minimum current Imin to the second minimum current Imin2.

If NO is determined in step S11, and if NO is determined in step S14, the fifth motor control circuit 35B executes step S23 and sets the maximum current Imax to the initial value, that is, the first maximum current Imax1, and sets the minimum current Imin to the initial value, that is, the first minimum current Imin1.

Figure 12:
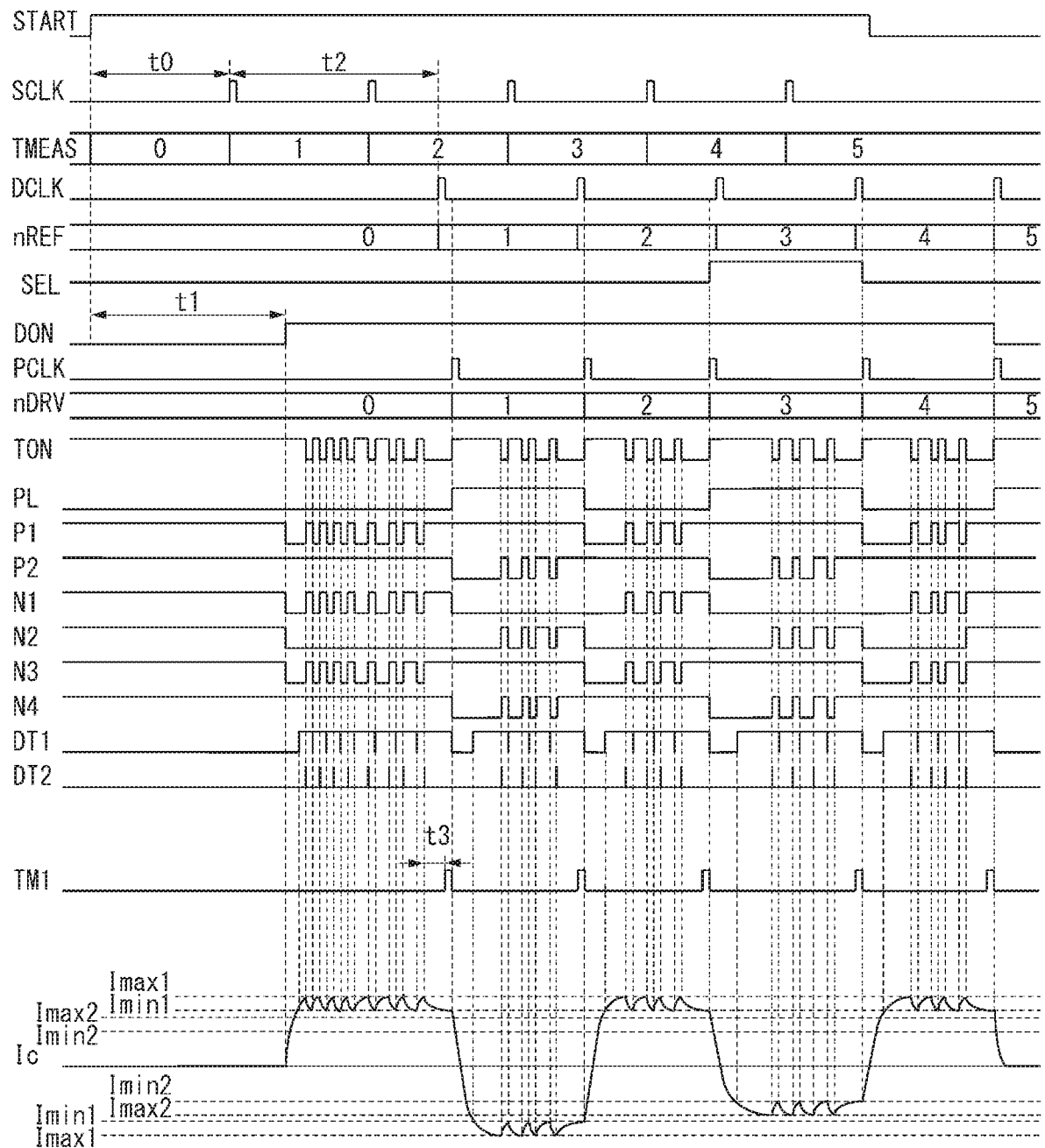
FIG. 12 is a timing chart describing the operation of the motor control process of the second embodiment.

As shown in FIG. 12, the first maximum current Imax1 is set to a value greater than the second maximum current Imax2, and the first minimum current Imin1 is set to a value greater than the second minimum current Imin2. The drive current is therefore lower when set to the second maximum current Imax2 and the second minimum current Imin2 than when the maximum current Imax and the minimum current Imin are set to the first maximum current Imax1 and the first minimum current Imin1, and the drive time is therefore longer.

Therefore, when the drive step count nDRV is greater than the reference step count nREF, that is, when the drive timing of the fifth motor 45 is earlier than the target timing, the drive time in the next step becomes longer.

However, when the drive step count nDRV is less than or equal to the reference step count nREF, that is, when drive timing of the fifth motor 45 is later than or matches the target timing, the drive time in the next step becomes shorter.

As a result, the drive timing converges to the target timing.

Effect of Embodiment 2

The effect of the fifth motor control circuit 35B according to the second embodiment is the same as the fifth motor control circuit 35 in the first embodiment.

The fifth motor control circuit 35B can also drive the fifth motor 45 more efficiently because the energy input to the coil 130 is controlled by changing the maximum current Imax between a first maximum current Imax1 and second maximum current Imax2, and changing the minimum current Imin between an first minimum current Imin1 and an second minimum current Imin2, based on the before and after relationship of the detection signal and the reference signal.

Embodiment 3

An electronic timepiece according to the third embodiment is described next with reference to FIG. 13 to FIG. 15. Note that configurations in the third embodiment that are the same or similar to configurations in the first or second embodiment are identified by the same reference numerals, and further description thereof is omitted.

Configuration

Figure 13:
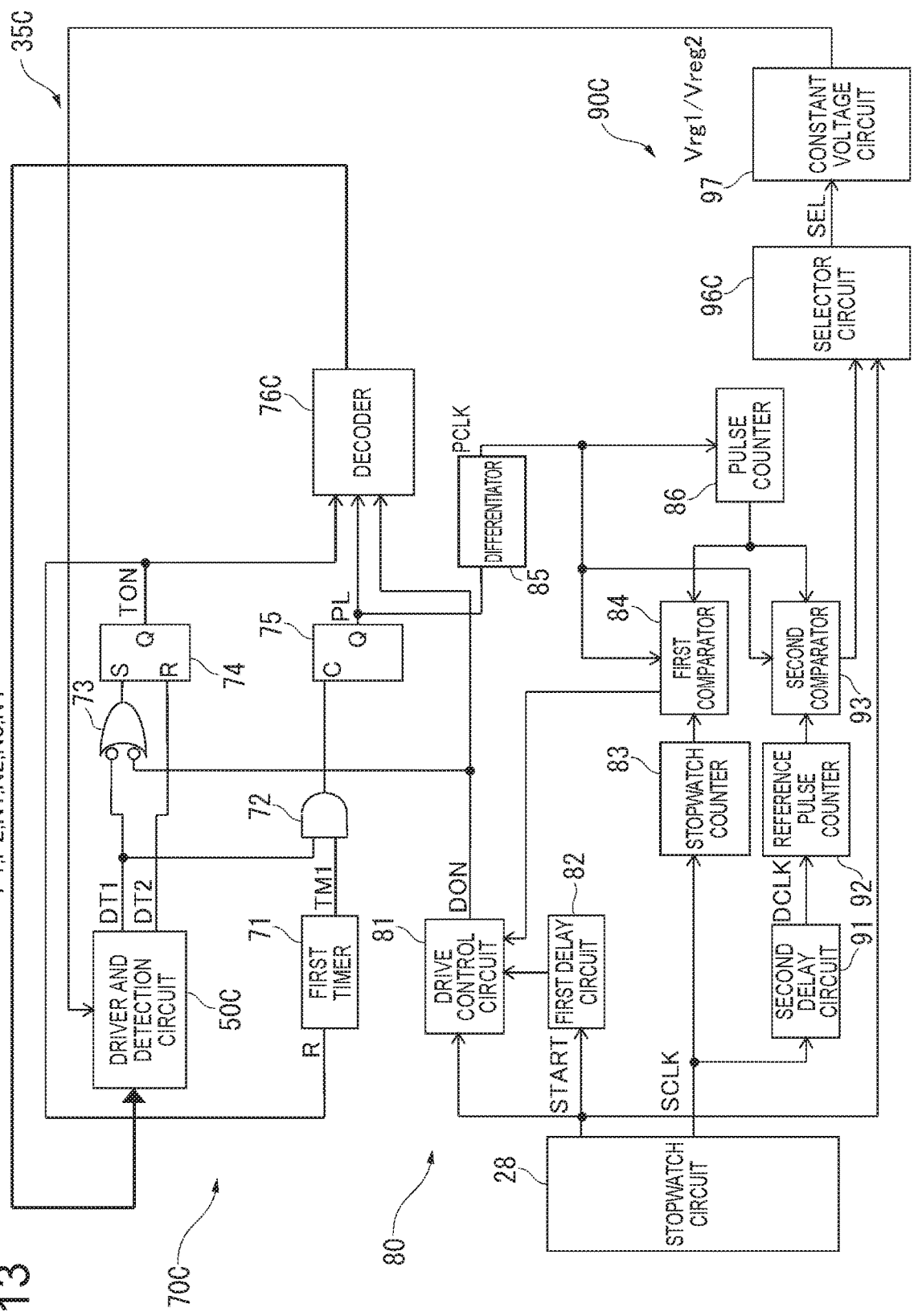
FIG. 13 is a circuit diagram showing the configuration of a motor control circuit in the third embodiment.
Figure 14:
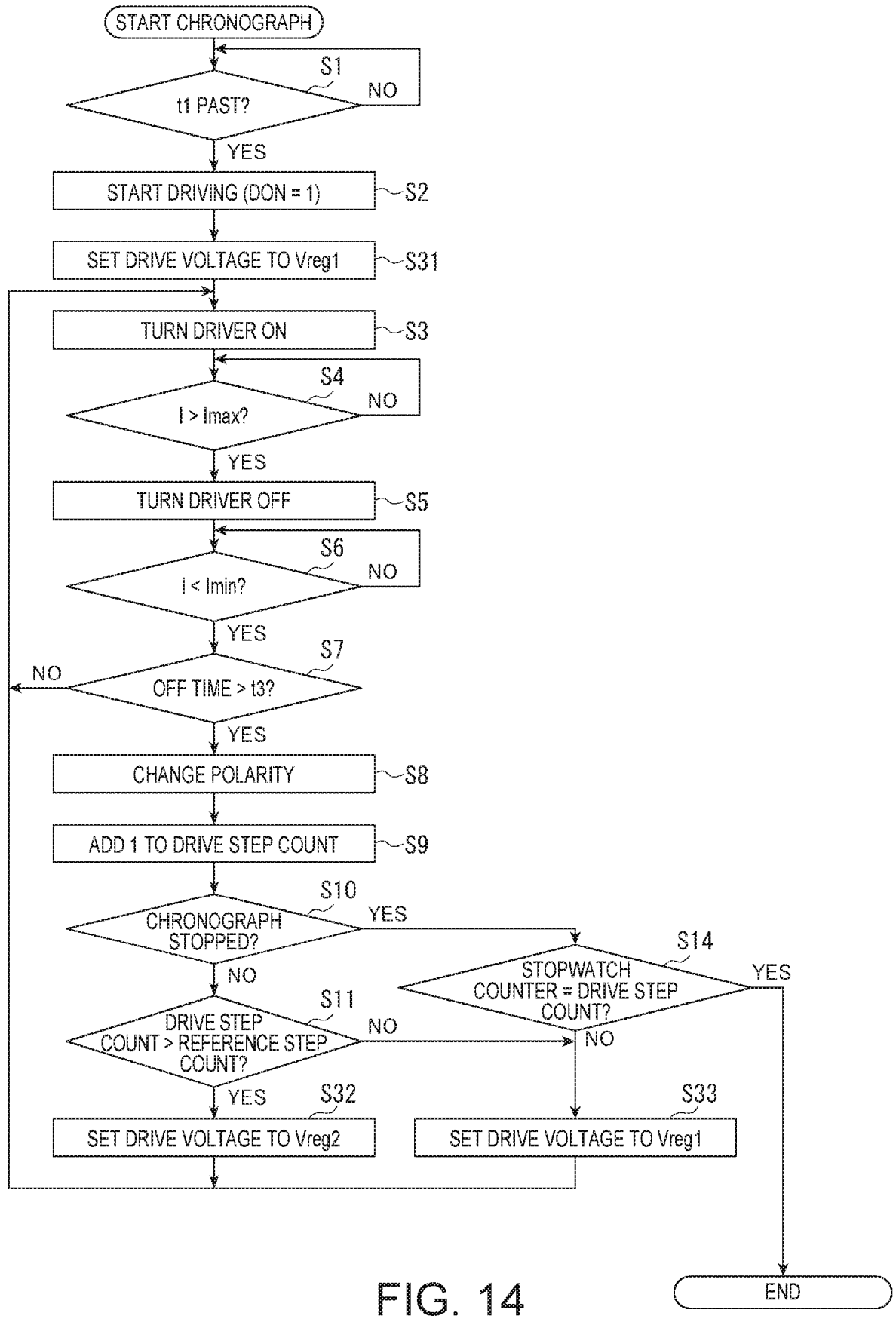
FIG. 14 is a flow chart describing the motor control process in the third embodiment.

An electronic timepiece according to the third embodiment has the fifth motor control circuit 35C shown in FIG. 13 instead of the fifth motor control circuit 35 of the first embodiment. This fifth motor control circuit 35C includes a motor controller 70C, chronograph controller 80, and drive cycle adjuster 90C.

The motor controller 70C includes a first timer 71, an AND circuit 72, an OR circuit 73, an SR latch circuit 74, and a flip-flop 75 configured as in the first embodiment, and a driver and detection circuit 50C, a decoder 76C that differ from those in the first embodiment.

While not shown in the figures, the driver and detection circuit 50C includes a driver 51 and current detection circuit 61 identical to the driver and detection circuit 50 of the first embodiment, and as shown in FIG. 13, is configured to enable supplying to the driver 51 a first drive voltage Vreg1 and a second drive voltage Vreg2 of different voltages from a constant voltage circuit 97 to the driver 51. As in the first embodiment, the driver 51 supplies current to the coil 130 of the fifth motor 45, and as in the first embodiment the current detection circuit 61 determines whether or not the current flow through the coil 130 exceeds maximum current Imax and minimum current Imin.

As with the decoder 76B according to the second embodiment of the invention, the decoder 76C outputs to the detection circuit 50C gate signals P1, P2, N1, N2, N3, N4 according to the states of the switching signal TON, drive polarity signal PL, and drive control signal DON.

The chronograph controller 80 is the same as the chronograph controller 80 in the first embodiment described above, and further description thereof is omitted.

The drive cycle adjuster 90C includes a second delay circuit 91, reference pulse counter 92, second comparator 93, pulse counter 86, a selector circuit 96C that differs from the selector circuit 96 of the first embodiment, and a constant voltage circuit 97.

The selector circuit 96C selects and supplies to the driver 51 a first drive voltage Vreg1 and a second drive voltage Vreg2 based on the output of the second comparator 93 and the state of the start signal START output from the stopwatch circuit 28. More specifically, the constant voltage circuit 97 supplies the first drive voltage Vreg1 when the selection signal SEL is Low, and supplies the second drive voltage Vreg2 when the selection signal SEL is High.

Operation of Embodiment 3

Control by the fifth motor control circuit 35C in the third embodiment is described next with reference to the flow chart in FIG. 14 and the timing chart in FIG. 15. Note that the processes of steps S1 to S11 and step S14 in the flow chart in FIG. 14 are the same as the processes of the same steps in the first and second embodiments, further description thereof is omitted, and the differences with the processes of the first and second embodiments are described below.

The fifth motor control circuit 35C executes step S31 after step S2, and sets the first drive voltage Vreg1 as the initial value of the drive voltage.

When YES is determined in step S11, the fifth motor control circuit 35C executes step S32 and sets the drive voltage to the second drive voltage Vreg2.

When NO is determined in step S11, and when NO is determined in step S14, the fifth motor control circuit 35C executes step S33 and sets the drive voltage to the first drive voltage Vreg1.

Figure 15:
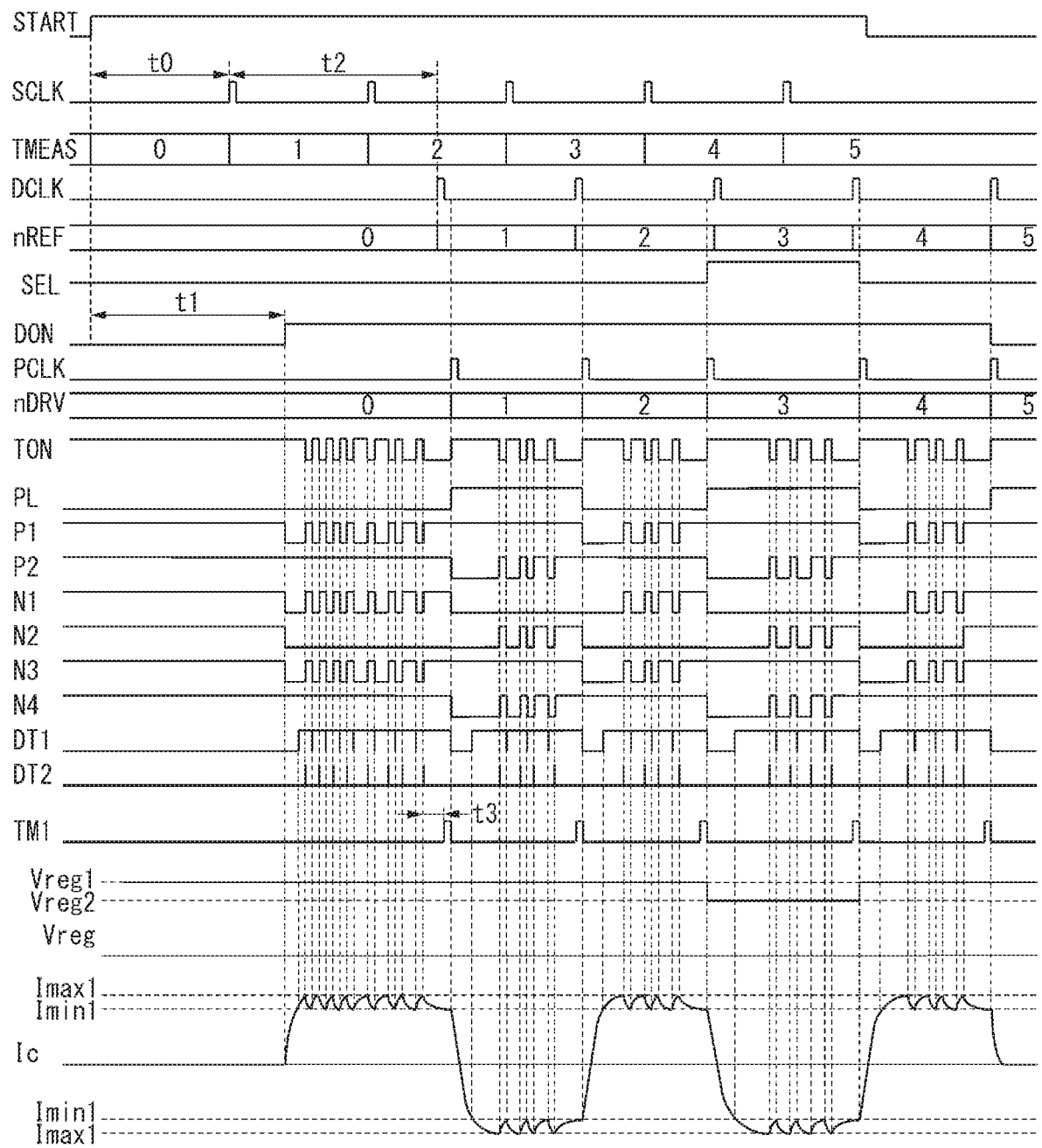
FIG. 15 is a timing chart describing the operation of the motor control process of the third embodiment.

As shown in FIG. 15, the first drive voltage Vreg1 is set to a value greater than the second drive voltage Vreg2. Because the drive voltage is lower when the drive voltage of the driver 51 is set to the second drive voltage Vreg2 than when set to the first drive voltage Vreg1, the drive time until the rotor 133 turns 180 degrees is longer.

Therefore, when the drive step count nDRV is greater than the reference step count nREF, that is, when the drive timing of the fifth motor 45 is earlier than the target timing, setting the drive voltage to the second drive voltage Vreg2 can increase the drive time compared with setting the drive voltage to the first drive voltage Vreg1.

However, when the drive step count nDRV is less than or equal to the reference step count nREF, that is, when the drive timing of the fifth motor 45 is later than or matches the target timing, setting the drive voltage to the first drive voltage Vreg1 can shorten the drive time compared with setting the drive voltage to the second drive voltage Vreg2.

As a result, the drive timing converges to the target timing.

For example, in the example shown in FIG. 15, at the timing the when the drive step count nDRV changes to 3 in conjunction with the drive polarity signal PL changing polarity, the drive step count nDRV is a value greater than the reference step count nREF, and the drive timing of the fifth motor 45 is earlier than the target timing. In this event, the selection signal SEL goes to High and the drive voltage is set to the second drive voltage Vreg2, and the drive time until the polarity changes is longer than when the drive voltage is set to the first drive voltage Vreg1.

However, at the timing when the drive step count nDRV changes to 1, 2, 4, or 5, the drive step count nDRV is less than or equal to the reference step count nREF. In this event, the selection signal SEL goes to Low, the drive voltage is set to the first drive voltage Vreg1, and the drive time until the polarity changes is shorter than when the drive voltage is set to the second drive voltage Vreg2.

As a result, the drive timing converges to the target timing.

Effect of Embodiment 3

The effect of the fifth motor control circuit 35C according to the third embodiment is the same as the fifth motor control circuit 35 in the first embodiment.

In addition, the fifth motor control circuit 35C can drive the fifth motor 45 more efficiently because the energy input to the coil 130 is controlled by changing the drive voltage to a first drive voltage Vreg1 and a second drive voltage Vreg2 based on the before and after relationship of the detection signal and the reference signal.

Embodiment

An electronic timepiece according to the fourth embodiment is described next with reference to FIG. 16 to FIG. 18. Note that configurations in the fourth embodiment that are the same or similar to configurations in the first to third embodiments are identified by the same reference numerals, and further description thereof is omitted.

Configuration

Figure 16:
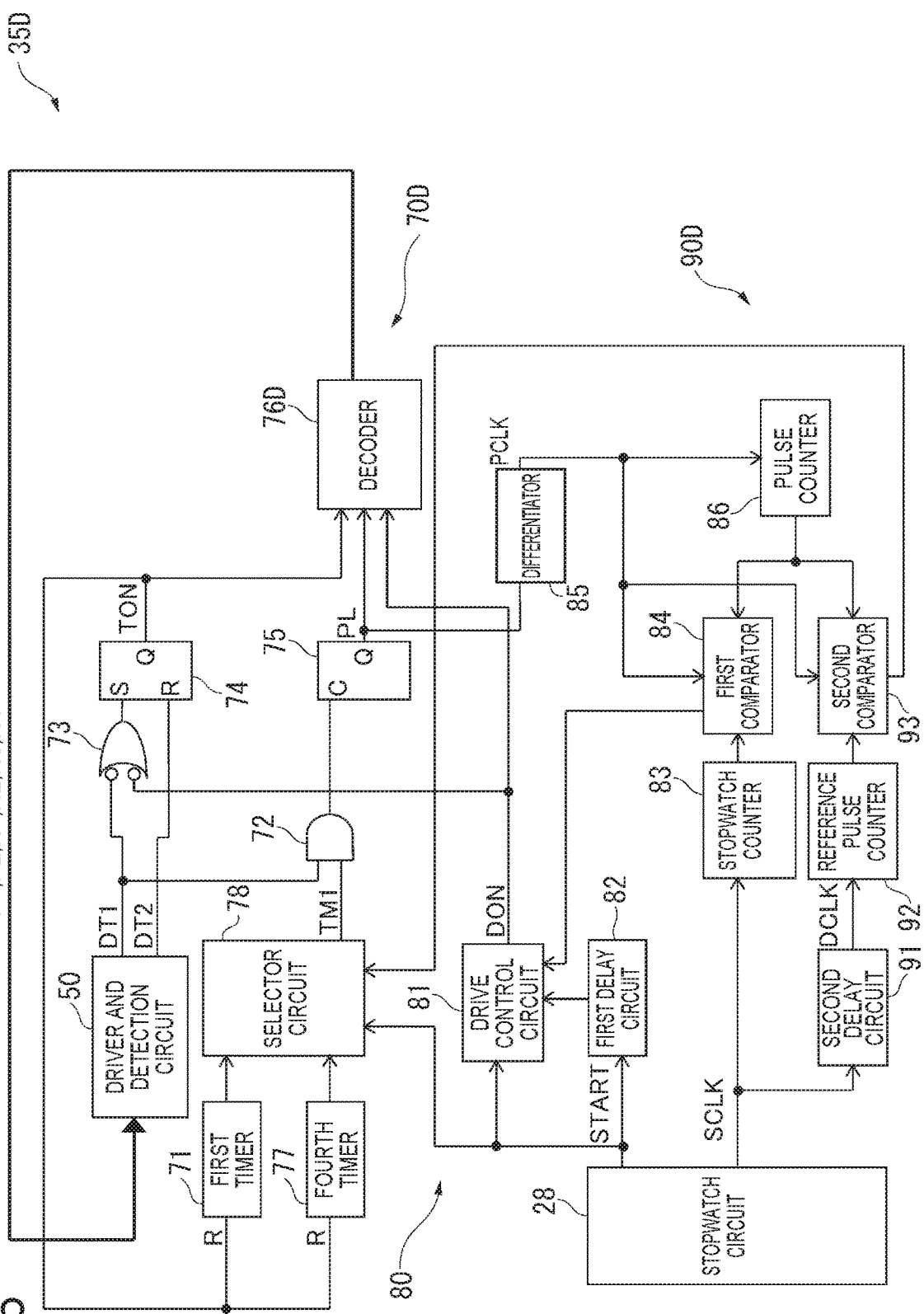
FIG. 16 is a circuit diagram showing the configuration of a motor control circuit in the fourth embodiment.
Figure 17:
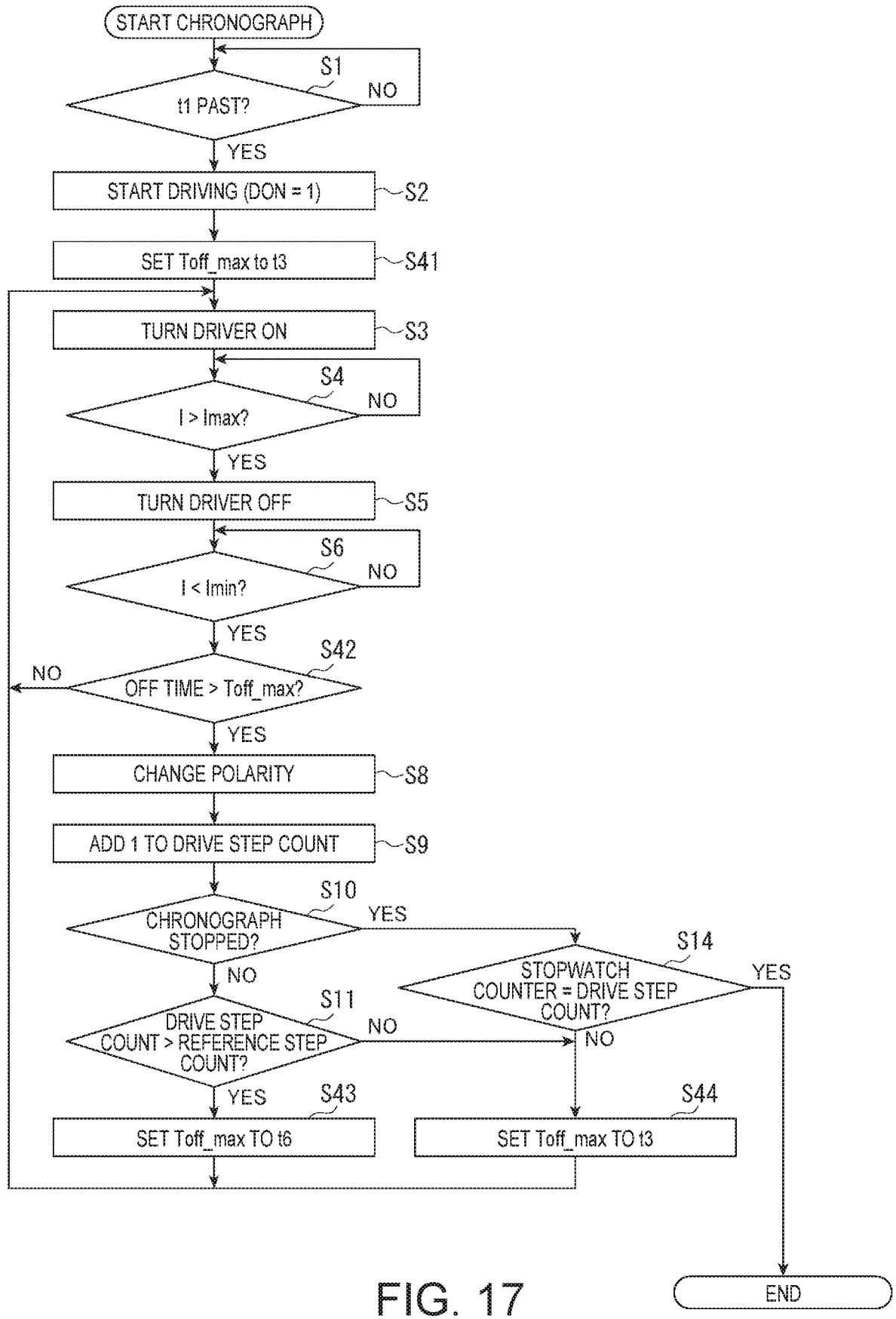
FIG. 17 is a flow chart describing the motor control process in the fourth embodiment.

An electronic timepiece according to the fourth embodiment uses a fifth motor control circuit 35D as shown in FIG. 16 instead of the fifth motor control circuit 35 of the first embodiment. This fifth motor control circuit 35D includes a motor controller 70D, chronograph controller 80, and drive cycle adjuster 90D.

The motor controller 70D includes a driver and detection circuit 50, a first timer 71, an AND circuit 72, an OR circuit 73, an SR latch circuit 74, and a flip-flop 75 configured as in the first embodiment, a decoder 76D that differs from the decoder 76 in the first embodiment, and a fourth timer 77 and a selector circuit 78.

Like the decoder 76B and decoder 76C of the second and third embodiments, the decoder 76D outputs gate signals P1, P2, N1, N2, N3, N4 to the driver and detection circuit 50 according to the states of the drive polarity signal PL and drive control signal DON.

As in the first embodiment, the first timer 71 measures the evaluation time t3, which is a first specific condition for changing the polarity of the current flowing to the coil 130 of the fifth motor 45. The output of the first timer 71 goes to High when the evaluation time t3 has past since the reset terminal goes Low and the reset state is cancelled.

The fourth timer 77 is a second timer for measuring an evaluation time t6, which is a second specific condition for changing the polarity of the current flowing to the coil 130 of the fifth motor 45. The output of the fourth timer 77 goes to High when the evaluation time t6 has past since the reset terminal goes Low and the reset state is cancelled. Note that as shown in FIG. 18 the evaluation time t6 is set to a longer time than evaluation time t3.

The chronograph controller 80 is the same as the chronograph controller 80 in the first embodiment described above, and further description thereof is omitted.

The drive cycle adjuster 90D includes a second delay circuit 91, reference pulse counter 92, second comparator 93, pulse counter 86, and the first timer 71, fourth timer 77, and selector circuit 78 of the motor controller 70D.

The selector circuit 78 selects the output of the first timer 71 or the fourth timer 77 as the output TM1 according to the selection signal SEL output from the second comparator 93, and the state of the start signal START output from the stopwatch circuit 28.

More specifically, the selector circuit 78 selects the output of the first timer 71 when the selection signal SEL is Low, and selects the output of the fourth timer 77 when the selection signal SEL is High.

Operation of Embodiment 4

Control by the fifth motor control circuit 35D in the fourth embodiment is described next with reference to the flow chart in FIG. 17 and the timing chart in FIG. 18. Note that the processes of steps S1 to S6, S8 to S11, and step S14 in the flow chart in FIG. 17 are the same as the processes of the same steps in the first to third embodiments, further description thereof is omitted, and the differences with the processes of the first to third embodiments are described below.

The fifth motor control circuit 35D executes step S41 after step S2, and sets the evaluation time t3 that is measured by the first timer 71 as the initial value of the evaluation threshold Toff_max for determining if the rotor 133 has turned 180 degrees. In other words, the selector circuit 78 selects the output of the first timer 71 as the output TM1.

If YES is determined in step S6, the fifth motor control circuit 35D executes step S42, and determines whether or not the off time of the driver 51 exceeds the evaluation threshold Toff_max.

When YES is determined in step S11, the fifth motor control circuit 35D executes step S43 and sets the evaluation threshold Toff_max to the evaluation time t6. In other words, the selector circuit 78 selects the output of the fourth timer 77 as the output TM1.

When NO is determined in step S11, and when NO is determined in step S14, the fifth motor control circuit 35C executes step S44 and sets the evaluation threshold Toff_max to the evaluation time t3. In other words, the selector circuit 78 selects the output of the first timer 71 as the output TM1.

Figure 18:
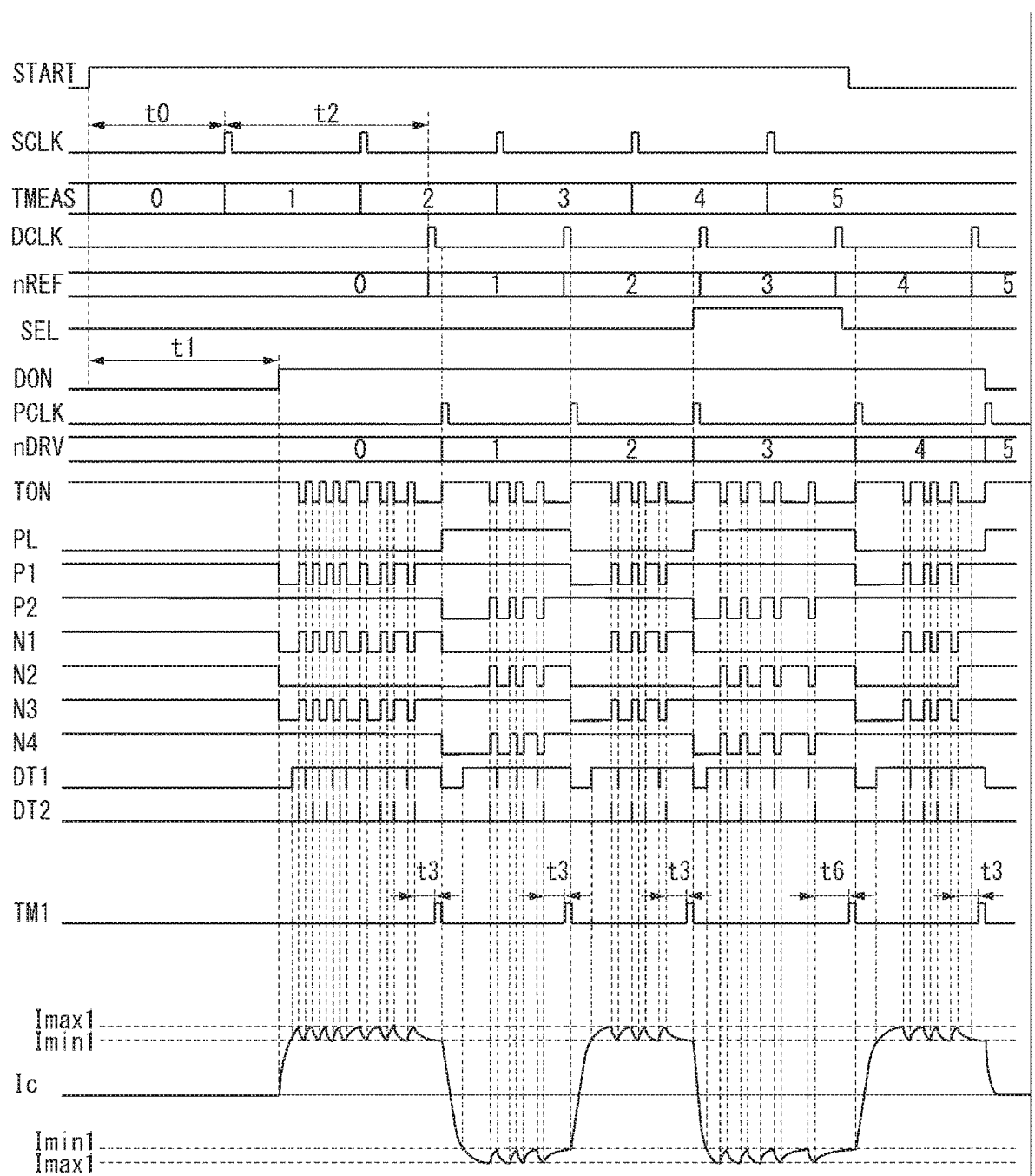
FIG. 18 is a timing chart describing the operation of the motor control process of the fourth embodiment.

As shown in FIG. 18, the evaluation time t6 is set to a longer time than evaluation time t3. As a result, the angle of rotation when rotation of the rotor 133 is detected is greater when evaluation threshold Toff_max is set to evaluation time t6 than when set to evaluation time t3, the timing when the polarity of the drive current changes is delayed, and the time until the rotor 133 turns 180 degrees is longer.

Therefore, when the drive step count nDRV is greater than the reference step count nREF, that is, when the drive timing of the fifth motor 45 is earlier than the target timing, setting the evaluation threshold Toff_max to the evaluation time t6 can increase the drive time compared with setting evaluation threshold Toff_max to the evaluation time t3.

However, when the drive step count nDRV is less than or equal to the reference step count nREF, that is, when the drive timing of the fifth motor 45 is later than or matches the target timing, setting the evaluation threshold Toff_max to evaluation time t3 can shorten the drive time compared with setting the evaluation threshold Toff_max to evaluation time t6.

As a result, the drive timing converges to the target timing.

For example, in the example shown in FIG. 18, at the timing the when the drive step count nDRV changes to 3 in conjunction with the drive polarity signal PL changing polarity, the drive step count nDRV is a value greater than the reference step count nREF, and the drive timing of the fifth motor 45 is earlier than the target timing. In this event, the selection signal SEL goes to High, the selector circuit 78 selects the output of the fourth timer 77, and evaluation threshold Toff_max is set to evaluation time t6. As a result, the drive time until the polarity changes is longer than when evaluation threshold Toff_max is set to evaluation time t3.

However, at the timing when the drive step count nDRV changes to 1, 2, 4, or 5, the drive step count nDRV is less than or equal to the reference step count nREF. In this event, the selection signal SEL goes to Low, the selector circuit 78 selects the output of the first timer 71 and evaluation threshold Toff_max is set to evaluation time t3, and the drive time until the polarity changes is shorter than when evaluation threshold Toff_max is set to evaluation time t6.

As a result, the drive timing converges to the target timing.

Effect of Embodiment 4

The effect of the fifth motor control circuit 35D according to the fourth embodiment is the same as the fifth motor control circuit 35 in the first embodiment.

In addition, the drive timing can be made to converge to the target timing by setting the evaluation threshold Toff_max used to change polarity to evaluation time t3 or evaluation time t6 based on the before and after relationship of the detection signal and the reference signal. As a result, optimal conditions can be set in each electronic timepiece by setting the evaluation time t3 and evaluation time t6 according to the load on the fifth motor 45, for example, based tests or simulations.

Variations of Embodiment 4

The evaluation time t3 and evaluation time t6 are previously set fixed values in the fourth embodiment, but evaluation time t3 and evaluation time t6 may be dynamically changed during control of the movement. For example, evaluation time t3 and evaluation time t6 may be changed according to the advance or delay in the drive timing relative to the target timing.

Embodiment 5

Figure 20:
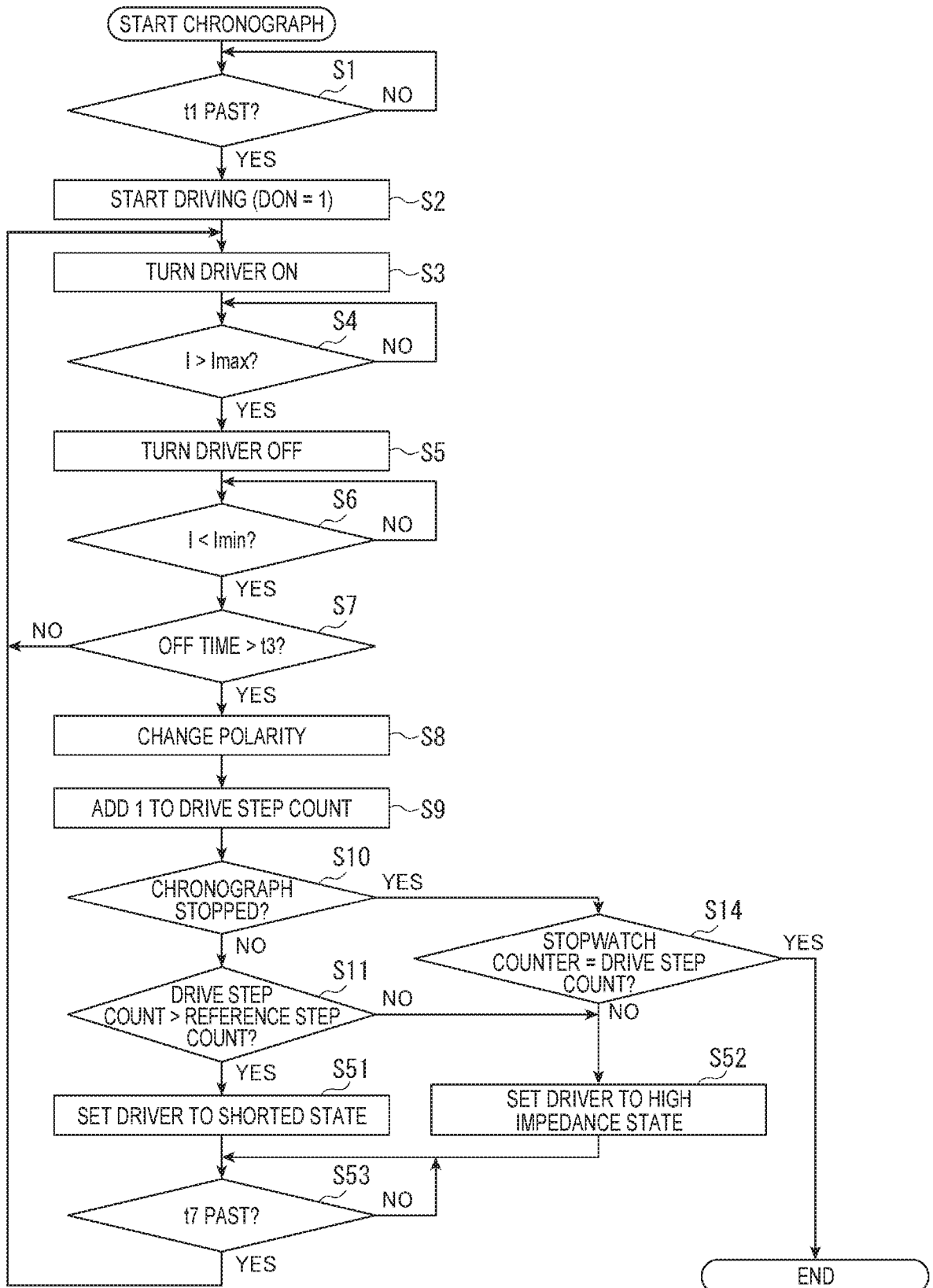
FIG. 20 is a flow chart describing the motor control process in the fifth embodiment.
Figure 21:
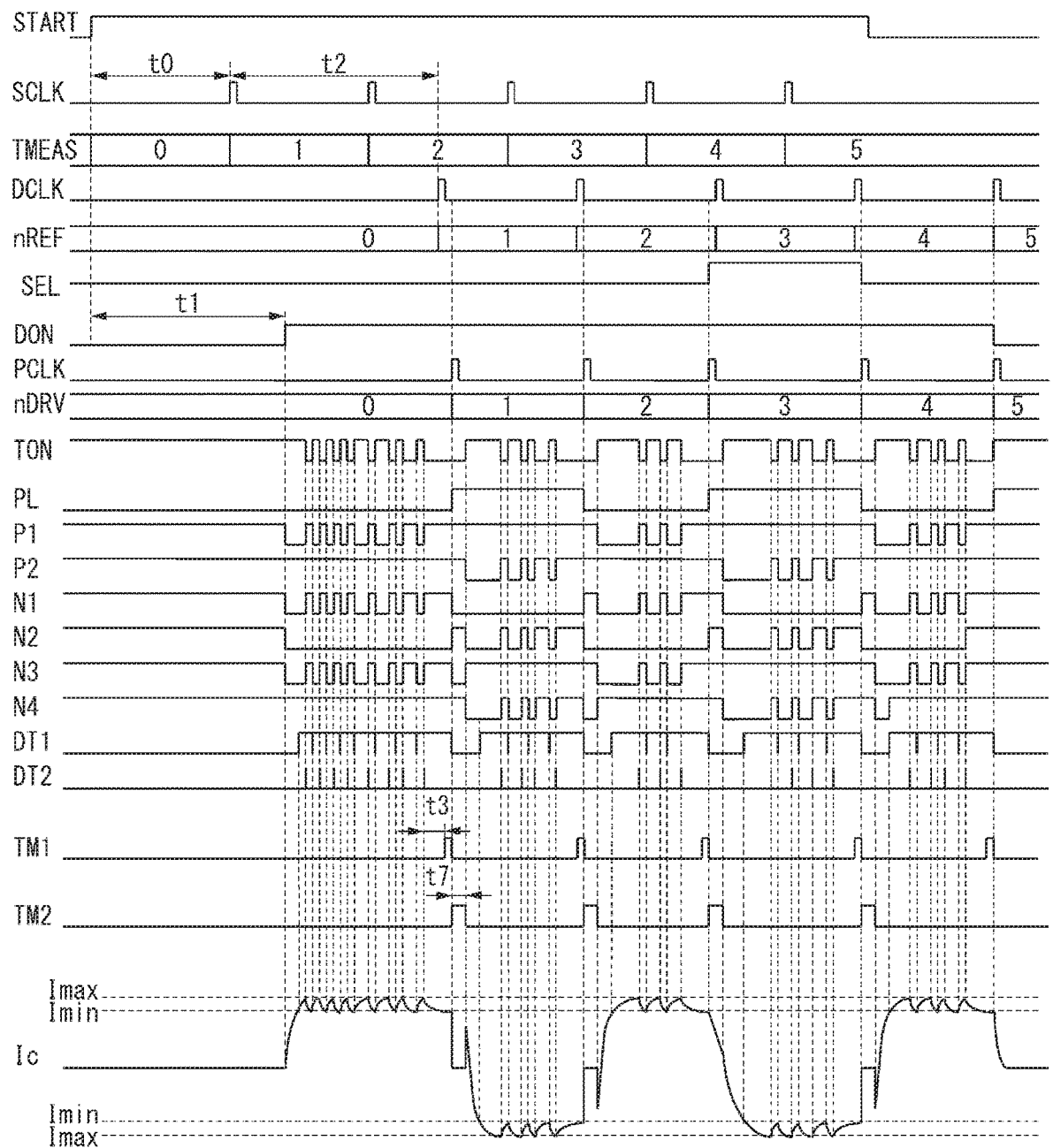
FIG. 21 is a timing chart describing the operation of the motor control process of the fifth embodiment.

An electronic timepiece according to the fifth embodiment is described next with reference to FIG. 19 to FIG. 21. Note that configurations in the fifth embodiment that are the same or similar to configurations in the first to fourth embodiments are identified by the same reference numerals, and further description thereof is omitted.

Configuration

Figure 19:
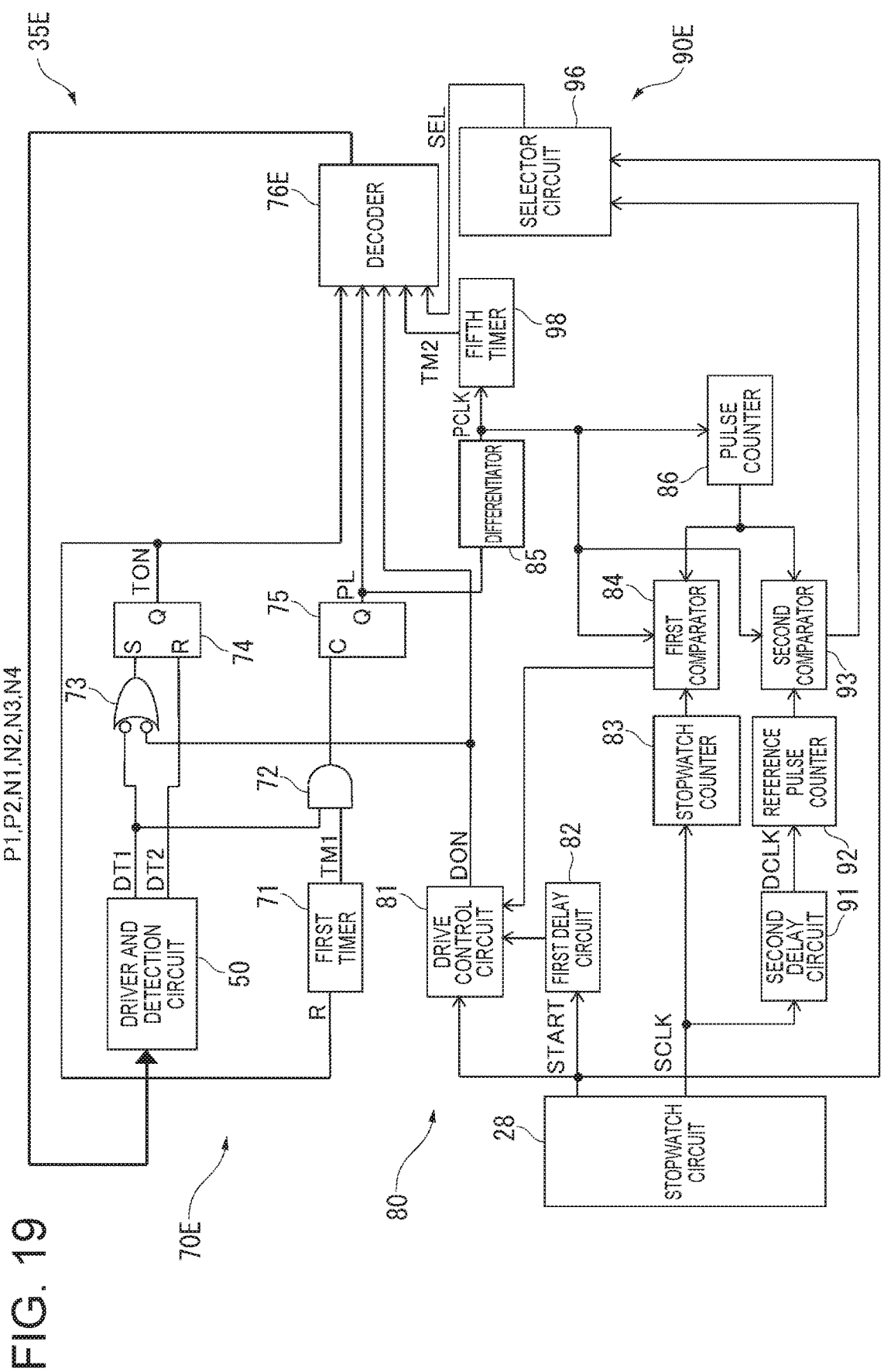
FIG. 19 is a circuit diagram showing the configuration of a motor control circuit in the fifth embodiment.

An electronic timepiece according to the fifth embodiment uses a fifth motor control circuit 35E as shown in FIG. 19 instead of the fifth motor control circuit 35 of the first embodiment. This fifth motor control circuit 35E includes a motor controller 70E, chronograph controller 80, and drive cycle adjuster 90E.

The motor controller 70E includes a driver and detection circuit 50, a first timer 71, an AND circuit 72, an OR circuit 73, an SR latch circuit 74, and a flip-flop 75 configured as in the first embodiment, and a decoder 76E that differs from the decoder 76 in the first embodiment.

The decoder 76E outputs gate signals P1, P2, N1, N2, N3, N4 to the driver and detection circuit 50 according to the states of the switching signal TON, drive polarity signal PL, drive control signal DON, timing signal TM2, and selection signal SEL.

The chronograph controller 80 is the same as the chronograph controller 80 in the first embodiment described above, and further description thereof is omitted.

The drive cycle adjuster 90E includes a second delay circuit 91, reference pulse counter 92, second comparator 93, pulse counter 86, selector circuit 96, and a fifth timer 98.

The selector circuit 78 changes the level of the selection signal SEL output to the decoder 76E according to the output from the second comparator 93, and the state of the start signal START output from the stopwatch circuit 28.

The fifth timer 98 outputs to the decoder 76E a signal that goes High when time t7 has past after the differential signal PCLK is output, that is, after the differential signal PCLK changes to High. Note that the fifth timer 98 may be the same as the second timer 94 in the first embodiment, for example. In this event, the time t7 is the same time as the first specific time t4.

Operation of Embodiment 5

Control by the fifth motor control circuit 35E in the fifth embodiment is described next with reference to the flow-chart in FIG. 20 and the timing chart in FIG. 21. Note that the processes of steps S1 to S11, and step S14 in the flow chart in FIG. 20 are the same as the processes of the same steps in the first to fourth embodiments, further description thereof is omitted, and the differences with the processes of the first to fourth embodiments are described below.

When YES is determined in step S11, the fifth motor control circuit 35E executes step S51, shorts the driver 51, and applies a short brake to the fifth motor 45.

When NO is determined in step S11, and when NO is determined in step S14, the fifth motor control circuit 35E executes step S52, and sets one end of the driver 51 to a high impedance state so that a short brake is not applied to the fifth motor 45.

The fifth motor control circuit 35E executes step S51 or S52 to set the driver 51 to the shorted state or the high impedance state, then until the fifth timer 98 determines time t7 has past, returns NO in step S53 and maintains the same settings.

When time t7 has past and YES is determined in step S53, the fifth motor control circuit 35E returns to step S3 and starts driving the next step.

If the driver 51 is shorted, a short brake is applied to the fifth motor 45 and the rotational speed of the rotor 133 drops. As a result, the drive time until the rotor 133 turns 180 degrees increases compared with when the driver 51 is set to a high impedance state.

Therefore, when the drive step count nDRV is greater than the reference step count nREF, that is, when the drive timing of the fifth motor 45 is earlier than the target timing, the drive time can be increased by shorting the driver 51 in step S51 compared with setting the driver 51 to a high impedance state in step S52.

However, when the drive step count nDRV is less than or equal to the reference step count nREF, that is, when the drive timing of the fifth motor 45 is later than or matches the target timing, setting the driver 51 to a high impedance state in step S52 can shorten the drive time compared with shorting the driver 51 in step S51.

As a result, the drive timing converges to the target timing.

Effect of Embodiment 5

The effect of the fifth motor control circuit 35E according to the fifth embodiment is the same as the fifth motor control circuit 35 in the first embodiment.

In addition, the drive timing can be made to converge more quickly to the target timing because the driver 51 is set to a high impedance state or shorted state based on the before and after relationship of the detection signal and the reference signal.

Variations of Embodiment 5

The fifth embodiment controls setting the driver 51 by selecting step S51 or step S52 after driving the first step of the fifth motor 45, but because driving the fifth motor 45 is unstable when driving starts, control may return to step S3 without executing steps S11, S51, S52, and S53, and control by steps S11, S51, S52, and S53 may start from controlling the second or third drive steps, for example.

In the fifth embodiment the driver 51 is set to the high impedance state or shorted state for all of time t7, but the times that the high impedance state or shorted state are set may be varied. For example, the ratio between the times that the high impedance state or shorted state are set, and the times the settings are cancelled, may be varied according to the advance or the delay of the drive timing to the target timing.

Other Embodiments

The invention is not limited to the embodiments described above, and can be modified and improved in many ways without departing from the scope of the accompanying claims.

The embodiments described above output a detection signal indicating the time to change polarity when the off time, which is the time the driver 51 is continuously off, is detected to have met a specific condition, but the detection signal may be output when the on time, which is time the driver 51 is continuously on, is detected to have met a specific condition.

In the embodiments described above the fifth motor control circuits 35 to 35E are configured with logic circuits, but a configuration using a CPU 23 that directly controls transistors 52 to 57 through a bus may be used.

A motor may also be controlling using combinations of the foregoing embodiments. For example, control that switches the maximum current Imax to a first maximum current Imax1 or second maximum current Imax2, and switches the minimum current Imin to a first minimum current Imin1 or second minimum current Imin2, as described in the second embodiment, may be combined with control that changes the evaluation time for evaluating rotation of the rotor 133 to a evaluation time t3 or a evaluation time t6 as described in the fourth embodiment.

Because the optimum evaluation time for detecting rotation of the rotor 133 may change when the maximum current and minimum current change, appropriate control may can be maintained by changing the evaluation time.

The motor may also be controlled using other combinations of the foregoing embodiments.

The foregoing embodiments set the drive control signal DON to High and start driving the fifth motor 45 after a first delay time t1 has past after the start signal START goes High, but the first delay time t1 may be omitted, and driving the fifth motor 45 may be started by setting the drive control signal DON to High in conjunction with the start signal START changing to High. For example, because the hands will not move too far when the fifth motor 45 is driven a specific number of steps, such as with a countdown timer that moves a hand from a specific starting position to the zero position, control is possible without setting a first delay time t1.

When a first delay time t1 is not set, there is also no need to set a second delay time t2 for delaying the output timing of the reference signal DCLK.

The electronic timepiece 1 is a wristwatch in the embodiments described above, but the electronic timepiece 1 may be a table clock, for example.

The motor control circuit of the invention is also not limited to a fifth motor control circuit 35 to 35E that moves a chronograph 1/500 second hand 8, and may be applied to the first motor control circuit 31 to fourth motor control circuit 34. More specifically, the invention can be widely applied to controlling hands that move according to the cycle of a reference signal in an electronic timepiece.

The invention is also not limited to controlling motors that drive the hands of a timepiece, and can be applied to motor control circuits for hands that are moved at a speed corresponding to a reference signal. In this case, the reference signal is not limited to a signal with a constant cycle, the reference signal may vary according to a measured value, and hands may be moved at a speed corresponding to the reference signal.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronic timepiece comprising:
   a motor with a coil;
   a driver that is controlled to an on state supplying drive current to the coil, and an off state not supplying the drive current;
   a current detector configured to detect a current value flowing through the coil;
   a controller configured to control the driver to the on state or the off state according to the current value detected by the current detector;
   a detection signal output device configured to output a detection signal in response to at least one of (i) an on time, which is a continuous time of the on state of the driver, meeting a first predetermined condition and (ii) an off time, which is a continuous time of the off state of the driver, meeting a second predetermined condition, the first predetermined condition and the second predetermined condition being for changing a polarity of the current flowing to the coil;
   a drive pulse counter configured to count a number of times the polarity is changed and output a drive step count of the number of times the polarity is changed;
   a reference signal output device configured to output a reference signal used as a reference of a drive speed of the motor;
   a reference pulse counter configured to count pulses of the reference signal and output a reference step count of the pulses of the reference signal; and
   a drive cycle adjuster configured to compare the drive step count to the reference step count and, each time the polarity is changed,
      determine that a pulse of the detection signal occurs after a pulse of the reference signal,
      based on the comparison between the drive step count and the reference step count and in response to the determination that the pulse of the detection signal occurs after the pulse of the reference signal, shorten a drive cycle of the motor compared with the drive cycle of the motor when the pulse of the detection signal occurs before the pulse of the reference signal,
      determine that the pulse of the detection signal occurs before the pulse of the reference signal, and
      based on the comparison between the drive step count and the reference step count and in response to the determination that the detection signal occurs before the pulse of the reference signal, lengthen the drive cycle of the motor compared with the drive cycle of the motor when the pulse of the detection signal occurs after the pulse of the reference signal.

2. The electronic timepiece described in claim 1, wherein:
   when the detection signal is output after the reference signal, the drive cycle adjuster changes a polarity of the drive current after a first specific time has passed, and
   when the detection signal is output before the reference signal, changes the polarity of the drive current after a second specific time, which is longer than the first specific time, has passed.

3. The electronic timepiece described in claim 1, wherein:
the current detector detects and compares the current value flowing through the coil with a minimum current and a maximum current; and
the drive cycle adjuster sets the minimum current to a first minimum current, and sets the maximum current to a first maximum current, when the detection signal is output after the reference signal, and
sets the minimum current to a second minimum current, which is smaller than the first minimum current, and sets the maximum current to a second maximum current, which is smaller than the first maximum current, when the detection signal is output before the reference signal.

4. The electronic timepiece described in claim 1, wherein:
the driver is configured to enable setting a drive voltage supplied to the coil to a first drive voltage or a second drive voltage that is lower than the first drive voltage; and
the drive cycle adjuster sets the drive voltage to the first drive voltage when the detection signal is output after the reference signal, and
sets the drive voltage to the second drive voltage when the detection signal is output before the reference signal.

5. The electronic timepiece described in claim 1, wherein:
the detection signal output device is configured to selectively set one of the first predetermined condition and the second predetermined condition; and
the drive cycle adjuster sets the first predetermined condition when the detection signal is output after the reference signal, and
when the detection signal is output before the reference signal, sets the second predetermined condition.

6. The electronic timepiece described in claim 1, wherein:
the driver is configured to enable setting a terminal supplying the drive current to the coil to a high impedance state or a shorted state; and
the drive cycle adjuster sets the terminal to the high impedance state when the detection signal is output after the reference signal, and
when the detection signal is output before the reference signal, sets the terminal to the shorted state.

7. The electronic timepiece described in claim 1, wherein:
the reference signal output device starts outputting the reference signal after a specific time has passed from starting driving the motor.

8. The electronic timepiece described in claim 7, further comprising:
a stopwatch circuit configured to start outputting a time measurement clock signal and measure time in response to input of a start signal;
the controller starting driving the motor when a first delay time has passed after input of the start signal; and
the reference signal output device outputs the time measurement clock signal delayed only a second delay time as the reference signal, the second delay time being set to a value greater than a cycle of the time measurement clock signal.

9. The electronic timepiece described in claim 8, wherein:
the second delay time is set to a value greater than or equal to a sum of a cycle of the time measurement clock signal and variation in a drive time of the first step of the motor; and the first delay time is set to a difference between the sum of the cycle of the time measurement clock signal and the second delay time, and an average drive time of the first step of the motor.

10. The electronic timepiece described in claim 1, wherein:
the current detector includes a minimum detector configured to detect that the current flowing through the coil changed from a state greater than the minimum current to a state less than the minimum current, and a maximum detector configured to detect that the current flowing through the coil changed from a state less than the maximum current to a state greater than the maximum current; and
the controller controls the driver to the on state in response to detection by the minimum detector, and controls the driver to the off state in response to detection by the maximum detector.

11. A movement comprising:
a motor with a coil;
a driver that is controlled to an on state supplying drive current to the coil, and an off state not supplying the drive current;
a current detector configured to detect a current value flowing through the coil;
a controller configured to control the driver to the on state or the off state according to the current value detected by the current detector;
a detection signal output device configured to output a detection signal in response to at least one of (i) an on time, which is a continuous time of the on state of the driver, meeting a first predetermined condition and (ii) an off time, which is a continuous time of the off state of the driver, meeting a second predetermined condition, the first predetermined condition and the second predetermined condition being for changing a polarity of the current flowing to the coil;
a drive pulse counter configured to count a number of times the polarity is changed and output a drive step count of the number of times the polarity is changed;
a reference signal output device configured to output a reference signal used as a reference of a drive speed of the motor;
a reference pulse counter configured to count pulses of the reference signal and output a reference step count of the pulses of the reference signal; and
a drive cycle adjuster configured to compare the drive step count to the reference step count and, each time the polarity is changed,
determine that a pulse of the detection signal occurs after a pulse of the reference signal,
based on the comparison between the drive step count and the reference step count and in response to the determination that the pulse of the detection signal occurs after the pulse of the reference signal, shorten a drive cycle of the motor compared with the drive cycle of the motor when the pulse of the detection signal occurs before the pulse of the reference signal,
determine that the pulse of the detection signal occurs before the pulse of the reference signal, and
based on the comparison between the drive step count and the reference step count and in response to the determination that the detection signal occurs before the pulse of the reference signal, lengthen the drive cycle of the motor compared with the drive cycle of the motor when the pulse of the detection signal occurs after the pulse of the reference signal.

12. A motor control circuit comprising:

a driver that is controlled to an on state supplying drive current to a coil of a motor, and an off state not supplying the drive current;

a current detector configured to detect a current value flowing through the coil;

a controller configured to control the driver to the on state or the off state according to the current value detected by the current detector;

a detection signal output device configured to output a detection signal in response to at least one of (i) an on time, which is a continuous time of the on state of the driver, meeting a first predetermined condition and (ii) an off time, which is a continuous time of the off state of the driver, meeting a second predetermined condition, the first predetermined condition and the second predetermined condition being for changing a polarity of the current flowing to the coil;

a drive pulse counter configured to count a number of times the polarity is changed and output a drive step count of the number of times the polarity is changed;

a reference signal output device configured to output a reference signal used as a reference of a drive speed of the motor;

a reference pulse counter configured to count pulses of the reference signal and output a reference step count of the pulses of the reference signal; and a drive cycle adjuster configured to compare the drive step count to the reference step count and, each time the polarity is changed, determine that a pulse of the detection signal occurs after a pulse of the reference signal, based on the comparison between the drive step count and the reference step count and in response to the determination that the pulse of the detection signal occurs after the pulse of the reference signal, shorten a drive cycle of the motor compared with the drive cycle of the motor when the pulse of the detection signal occurs before the pulse of the reference signal, determine that the pulse of the detection signal occurs before the pulse of the reference signal, and based on the comparison between the drive step count and the reference step count and in response to the determination that the pulse of the detection signal occurs before the pulse of the reference signal, lengthen the drive cycle of the motor compared with the drive cycle of the motor when the pulse of the detection signal occurs after the pulse of the reference signal.

\* \* \* \* \*